United States Patent [19]

Tamura et al.

[11] Patent Number: 5,602,650
[45] Date of Patent: Feb. 11, 1997

[54] INFORMATION PROCESSING APPARATUS EQUIPPED WITH DETACHABLE IMAGE READER

[75] Inventors: Yoshimi Tamura; Masashi Hara; Satoshi Yamada, all of Nara, Japan

[73] Assignee: Sharp Kabushiki Kaisha, Osaka, Japan

[21] Appl. No.: 415,133

[22] Filed: Mar. 30, 1995

[30] Foreign Application Priority Data

May 16, 1994 [JP] Japan .................................. 6-126965

[51] Int. Cl.⁶ ................................................ H04N 1/024
[52] U.S. Cl. ........................ 358/400; 358/473; 358/442
[58] Field of Search .................................... 358/473, 474, 358/476, 470, 400, 296, 498, 496, 403, 442, 468, 471; 382/313, 314, 315

[56] References Cited

U.S. PATENT DOCUMENTS

| | | | |
|---|---|---|---|
| 4,587,633 | 5/1986 | Wang et al. | 358/403 |
| 4,989,237 | 1/1991 | Kotani et al. | 379/100 |
| 5,166,812 | 11/1992 | Dow et al. | 358/498 |
| 5,243,149 | 9/1993 | Comerford et al. | 178/18 |
| 5,402,251 | 3/1995 | Ogasawara et al. | 358/473 |
| 5,412,490 | 5/1995 | Kojima et al. | 358/473 |
| 5,452,106 | 9/1995 | Perkins | 358/468 |
| 5,479,269 | 12/1995 | Bronnenberg et al. | 358/403 |

FOREIGN PATENT DOCUMENTS

| | | |
|---|---|---|
| 1-235465 | 9/1989 | Japan . |
| 3-175871 | 7/1991 | Japan . |

Primary Examiner—Kim Vu
Assistant Examiner—Fan Lee
Attorney, Agent, or Firm—Nixon & Vanderhye, P.C.

[57] ABSTRACT

An information processing apparatus comprising image reading means for reading image data, a body with control means for subjecting read image data to information processing together with document data, and receiving means for receiving the image reading means, the receiving means being detachably data mounted in the body, wherein which is configured to allow a document, which is to be read by the image reading means, to travel across a surface that includes the reading position of the image reading means, while the image reading means is mounted in the body by being housed in the receiving means.

27 Claims, 25 Drawing Sheets

INFORMATION PROCESSING APPARATUS EQUIPPED WITH DETACHABLE IMAGE READER

BACKGROUND OF THE INVENTION

1. Field of the Invention

The present invention relates to a printer-incorporating information processing apparatus equipped With an image reading device, such as a word processor, personal computer, etc.

2. Description of the Related Art

Conventional information processing apparatuses detachably equipped with an image reading device are disclosed in Japanese Patent Application Disclosure HEI 1-235465 and Japanese Patent Application Disclosure HEI 3-175871.

The information processing apparatus disclosed in Japanese Patent Application Disclosure HEI 1-235465 is a communication apparatus equipped with an image reading device, or a facsimile machine, wherein the image reading device is detachably mounted in the communication apparatus body. In addition, this information processing apparatus is provided with detection means for detecting whether the image reading device is used as a hand-held scanner. The document feeding system of the disclosed information processing apparatus is constructed in such a manner that the feeding roller comes into contact with the image sensor at the image reading station.

The information processing apparatus disclosed in Japanese Patent Application Disclosure HEI 3-175871 also relates to a facsimile machine on the body of which is detachably mounted a scanner connected with the body through a connecting cord. The scanner is mounted into the body by sliding the scanner into a scanner receiving bay formed in the body through the side of the body. This information processing apparatus is also provided with detection means for detecting whether the image reading device is used as a hand-held scanner.

However, all the aforementioned techniques of the prior art relate to facsimile machines, not to information processing machines such as word processors, personal computers, etc. There is no provision of detachable image reading device-equipped information processing machines such as word processors, personal computers, etc.

Regarding conventional information processing apparatuses equipped with an image reading device, such as word processors, personal computers, etc., the image reading device is incorporated in a printer unit in the body of the information processing apparatus, or the image reading device is provided as an external hand-held scanner. With the configuration wherein the image reading device is incorporated inside the body, images on sheet-like documents may be read, but book-like documents cannot be subjected to image reading since the image reading device cannot be located outside the body. Accordingly, reading of images in books requires an additional hand-held scanner, and thus functionality is poor.

On the other hand, with the configuration wherein the image reading device is provided as an external hand-held scanner, since the image reading apparatus and the body are separate structures, the connecting cord, which connects the body and the image reading device, must be removed from the body in order to house the image reading device and the body separately when the information processing apparatus is to be stored. When the stored information processing apparatus is taken out and used again for reading an image, the body and the image reading device must be reconnected with the connecting cord. Accordingly, in cases where the user frequently takes out and stores the information processing apparatus, he is compelled to connect or remove the connecting cord to and from the body each time image reading is carried out, resulting in poor operability of the information processing apparatus.

SUMMARY OF THE INVENTION

It is an object of the present invention to provide an information processing apparatus equipped with a detachable image reading device, such as a word processor, personal computer, etc., with improved functionality and operability.

The invention relates to an information processing apparatus comprising:

an image reading means for reading image data;

a body with control means for subjecting the read image data to information processing together with the document data; and receiving means for receiving the image reading means, wherein the receiving means is detachably mounted in the body.

The invention is further characterized in that the body is equipped with document feeding means which is configured to allow a document, which is to be read by the image reading means, to travel across a surface that includes the reading position of the image reading means, while the image reading means is mounted in the body by being housed in the receiving means.

The invention is further characterized in that the body comprises:

printing means for printing on recording paper; and a cover member for covering/uncovering a prescribed region located over the body, and the prescribed region is provided with a paper insertion port for inserting the recording paper to be printed by the printing means; a paper outlet for ejecting the recording paper printed by the printing means; and a document insertion port for inserting the document to be read by the image reading means.

The present invention is further characterized in that the feeding means comprises:

a feeding roller placed at a position facing the surface of the image reading means which includes the reading position, and spaced a prescribed distance from the image reading means;

a pinch roller placed in the direction of feeding of the document, upstream from the reading position of the image reading means and in contact with the circumference (outer surface) of the feeding roller; and a guide member in contact with the circumference of the feeding roller placed in the direction of feeding, downstream from the contact position of the feeding roller and the pinch roller.

An information processing apparatus according to the present invention is comprised of image reading means, a body and receiving means. The image data read by the image reading means is subjected to information processing by control means built in the body, together with the document data. The receiving means receives the image reading means and is mounted in the body in a detachable manner. More specifically, since the image reading means is mounted in the body by being received in the receiving means, the image reading means received in the body may be precisely positioned relative to the body regardless of the shape of the image reading means, and thus the image reading means may have an increased degree of freedom regarding its shape.

Also according to the invention, the body of the information processing apparatus is equipped with feeding means. This feeding means feeds the document to be read by the image reading means mounted in the body by being received in the receiving means in such a manner that the document travels across the surface which includes the reading position of the image reading means. Accordingly, reading of the document image may be performed even when the image reading means is mounted in the body, and as a result there is no need to demount the image reading means from the body each time reading of an image is conducted, thus improving image reading operability.

Also according to the invention, the body of an information processing apparatus comprises printing means for printing on recording paper and a cover member for covering and uncovering a prescribed region located above the body. Provided in the prescribed region above the body are a paper insertion port for inserting recording paper for printing by printing means, a paper outlet for ejecting the recording paper printed by the printing means and an document insertion port for inserting the document to be read by the image reading means. As a result, since the document insertion port is located above the body, a document may be inserted into the document insertion port from above the body, thereby facilitating insertion of the document, and thus the operability of the information processing apparatus may be improved. In addition, since the document insertion port, paper insertion port and paper outlet are all covered and uncovered by a single cover member, no separate cover member is required for the document insertion pert even in cases where the document insertion port is provided in the body, and thus opening and closing operation for the cover member may be made less often.

Also according to the invention, the feeding means mounted in the body is comprised of a feeding roller, a pinch roller and a guide member. The feeding roller is placed at a position facing the surface of the image reading means which includes the reading position, spaced a prescribed distance from the image reading means. The pinch roller is placed in the direction of feeding of the document, upstream from the reading position of the image reading means, and in contact with the circumference of the feeding roller. The guide member is in contact with the circumference of the feeding roller, downstream from the contact position of the feeding roller and the pinch roller in the direction of feeding.

When an user feeds a document through the feeding means, the front end of the document in the direction of feeding comes into contact with the contact position of the pinch roller and feeding roller. Then, upon rotation of the feeding roller which is user controlled, the pinch roller also starts to rotate, and the document is fed downstream in the direction of feeding as the feeding roller rotates, while being sandwiched between the feeding roller and the pinch roller. The document fed in this way travels across the reading position of the image reading means, and the image on the document is read by the image reading means.

Since the feeding roller is spaced at a prescribed stance from the surface of the image reading means which includes the reading position, the document may be fed in a trouble-free manner between the feeding roller and the image reading means so that an image may be read from the document in a satisfactory manner without wrinkles, etc.

The document which is sandwiched and fed between the feeding roller and the pinch roller continues to be fed, even after its tail edge in the direction of feeding has traveled across the contact position of the feeding roller and the pinch roller, downstream from the contact position in the direction of feeding while still being sandwiched between the guide member and the feeding roller. Accordingly, even if there is a space between the feeding roller and the surface of the image reading means which includes the reading position, the document may be fed until the tail edge of the document upstream in the direction of feeding has traveled across the guide member, thereby allowing the image reading means to read even the tail edge portion of the document.

Alternatively, the image reading means may be designed so that the reading of a document starts after the inserted document has been fed a prescribed distance by the feeding means. For example, in cases where it is designed so that the reading of a document by the image reading means starts after the downstream end of the document in the direction of feeding has been fed from the contact position between the feeding roller and the pinch roller to the reading position of the image reading means, since the reading of the document starts after the document has reached the reading position, there is no possibility that the reading of the image will start before the document has reached the reading position to cause the read image to contain unwanted parts. The result is that there is no need for the user to erase unwanted parts contained in the read image, and thus the operability of the image reading device is improved.

In addition , the feeding means and the printing means may be designed to be controlled by the same control circuit. This sharing of the control circuit avoids the need to provide the feeding means with a separate control circuit even in cases where the body is equipped with the feeding means, and increase in the cost of the image processing apparatus may be prevented accordingly. In addition, since there is no need to provide respective control circuits, the information processing apparatus may be made more compact.

Since the body of the information processing apparatus according to the invention may be provided with document feeding means, reading of an image on the document may be accomplished even if the image reading means remains mounted in the body. As a result, even with repeated use of the information processing apparatus, since there is no need to demount the image reading means from the body each time the image reading means is used for reading an image, the image reading operability may be improved. Furthermore, since the image reading means may be demounted from the body for reading image data on newspaper or books, there is no need to provide a hand-held scanner separately, and thus the information processing apparatus has an added function.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Figure 1:
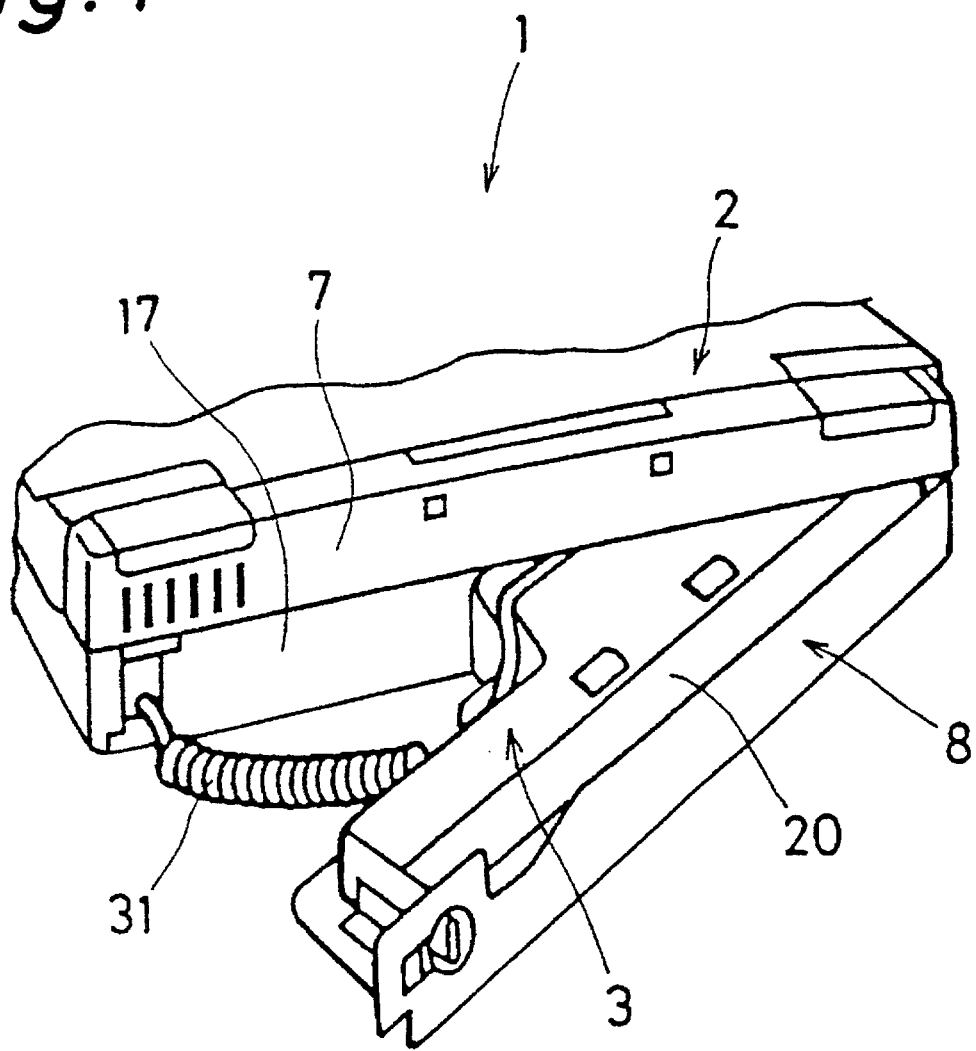
FIG. 1 is a fragmentary perspective view of an information processing apparatus 1 according to the invention, which is a word processor, when viewed from its back.

Now referring to the drawings, preferred embodiments of the invention are described below.

Figure 2:
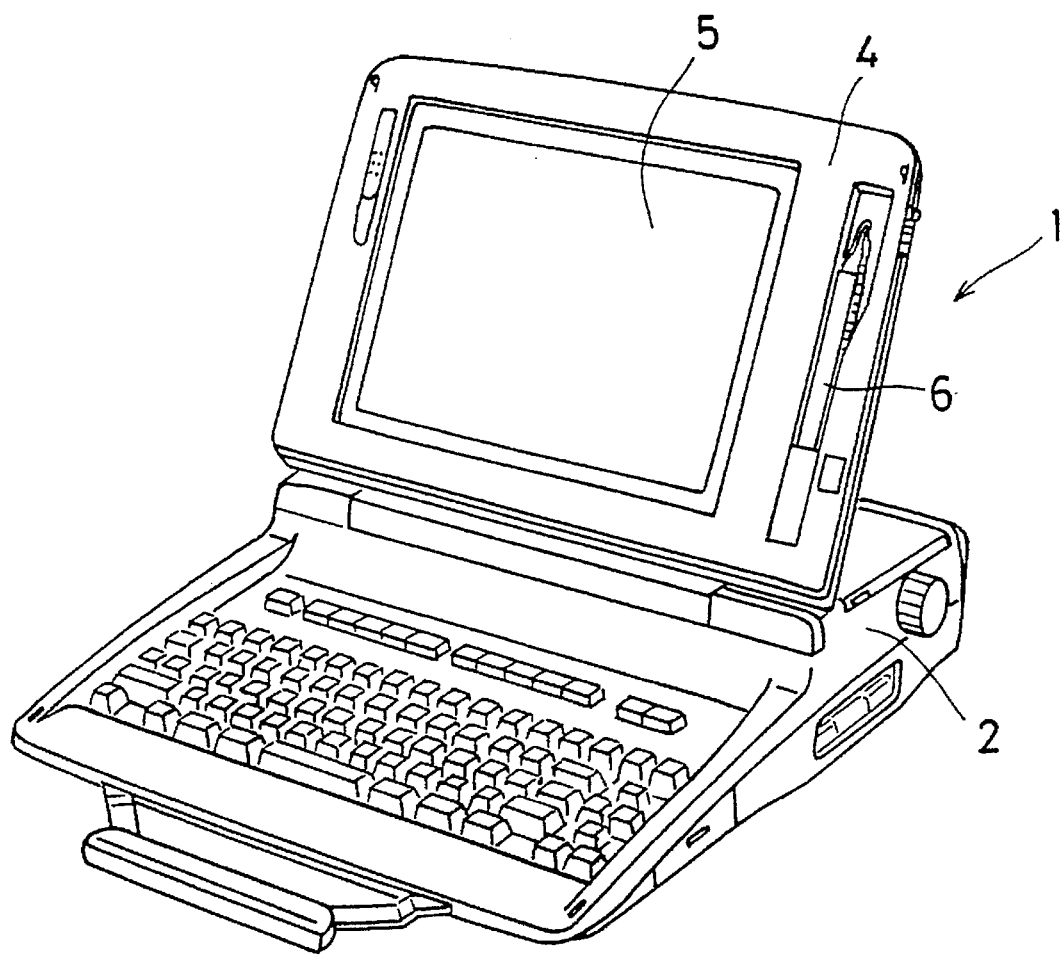
FIG. 2 is a perspective view of the information processing apparatus 1, when viewed from its front.

FIG. 1 is a fragmentary perspective view which shows the configuration of an information processing apparatus 1 according to an embodiment of the invention, which is a word processor, when viewed from its back. FIG. 2 is a perspective view of the information processing apparatus 1, when viewed from its front. A display section 4 is provided on top of the body 2 of the information processing apparatus 1. The display section 4 is equipped with a display panel 5 which has a tablet attached on its surface to allow input with a pen 6.

A recess 17 is provided in the back of the body 2, as shown in FIG. 1. The recess 17 receives a detachably mounted receiving box 8. The receiving box 8 receives an image reading device 3, with a reading glass 20 surface up. An electrical connection is established between the image reading device 3 and the body 2 via a cable 31.

Figure 3:
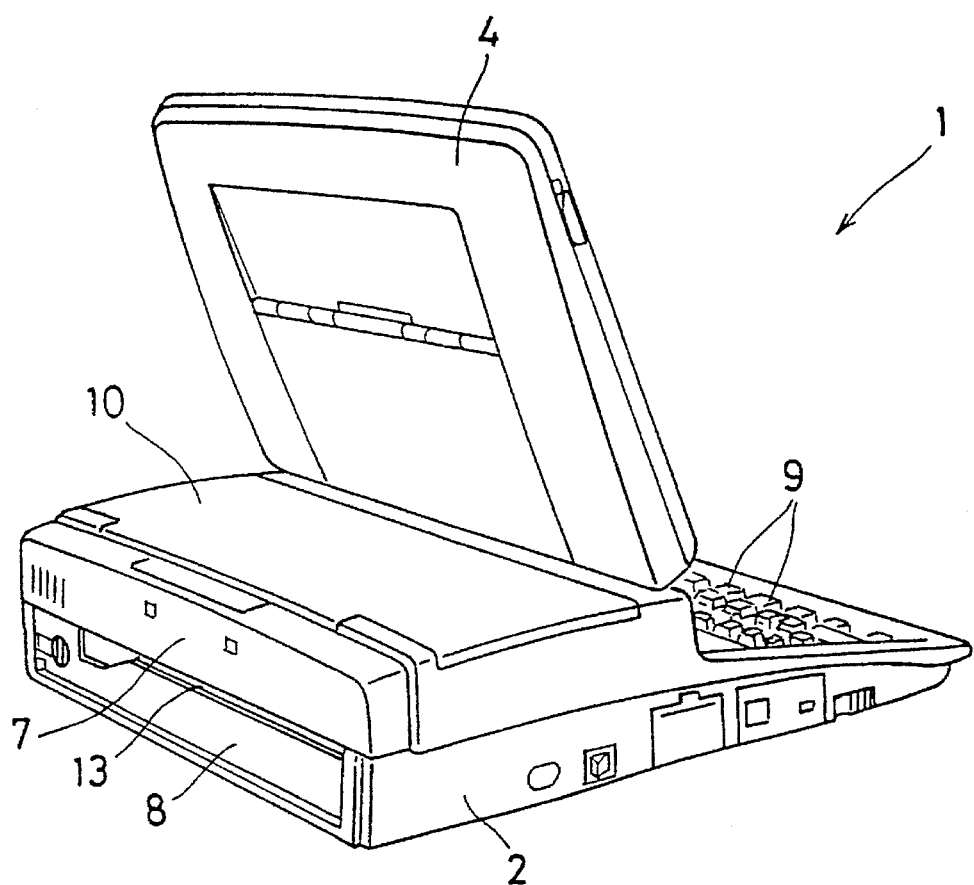
FIG. 3 is a perspective view of the information processing apparatus 1, when viewed from its back.

FIG. 3 is a perspective view showing the image processing apparatus 1, when viewed from its back. On the back of the body 2, the image reading device 3 is detachably mounted in the receiving box 8 through the back side 7 of the body 2. Positioned on top of the body 2 is an openable printer cover 10 which covers the region behind the region of a plurality of input keys 9.

Figure 4:
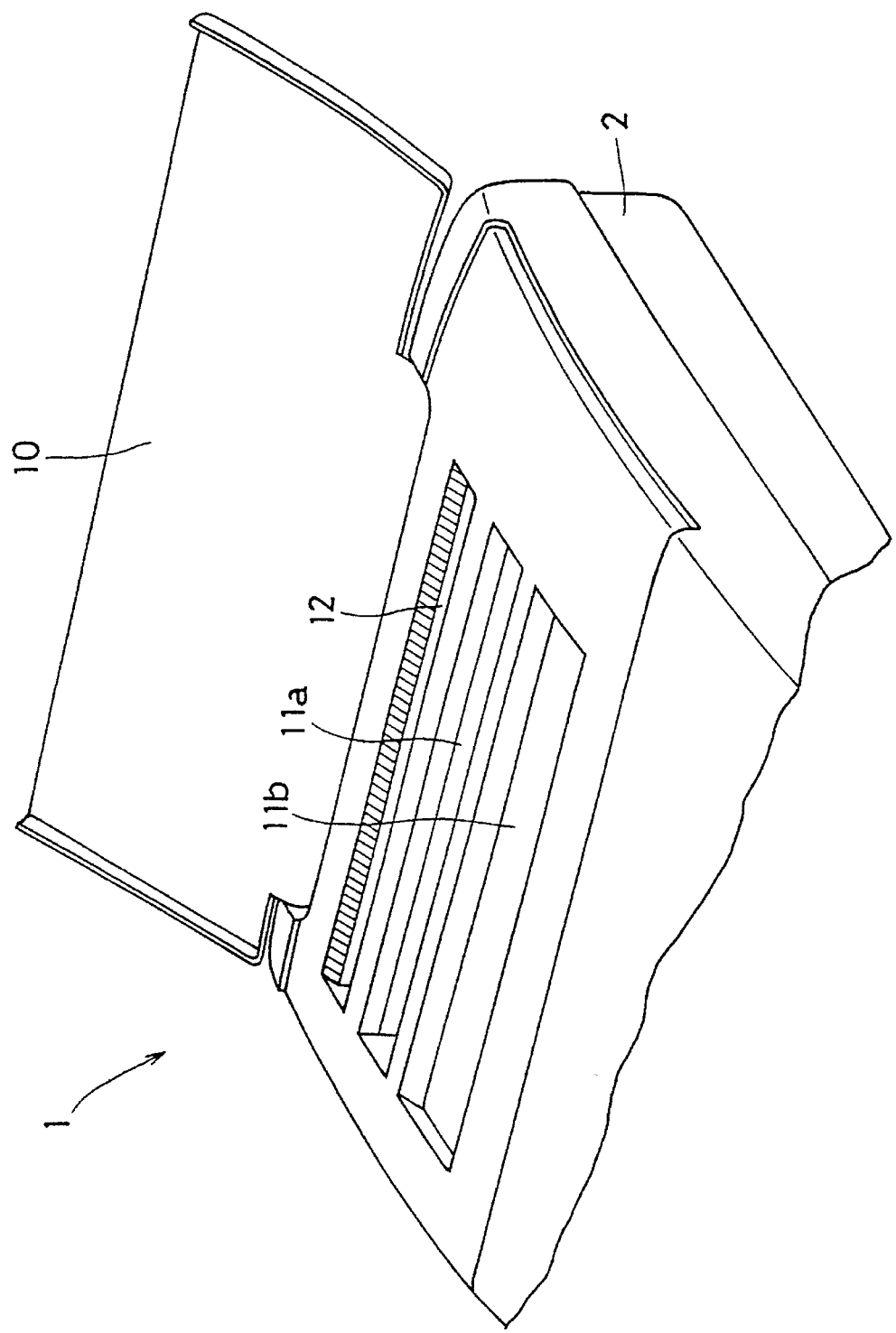
FIG. 4 is an enlarged perspective view of the tail end portion of the body 2 of the information processing apparatus 1.

FIG. 4 is an enlarged perspective view which shows the tail end portion of the body 2 of the information processing apparatus 1, with the printer cover 10 open. The printer cover 10 is attached to the tail end portion on top of the body 2 in an openable manner. The top region of the body 2 which is covered and uncovered by the printer cover 10 is provided with a paper outlet lib, a paper insertion port 11a and a document insertion port 12 in that order from its front end. The paper insertion port 11a is an opening for insertion of recording paper into a printer 21 which will be described later. The paper outlet 11b is an opening for ejecting recording paper printed by the printer 21. The document insertion port 12 is an opening for inserting the document with an image to be read by the image reading device 3 mounted in the body 2, into feeding means 22 which will be described later. The document inserted through the document insertion port 12 is ejected via an outlet 13 provided at the back side 7 of the body 2, as shown in FIG. 3.

The printer cover 10 is closed when neither printing nor image reading is performed, during which time the paper insertion port 11a, paper outlet 11b and document insertion port 12 are closed and kept dust-tight for the body 2.

Figure 5:
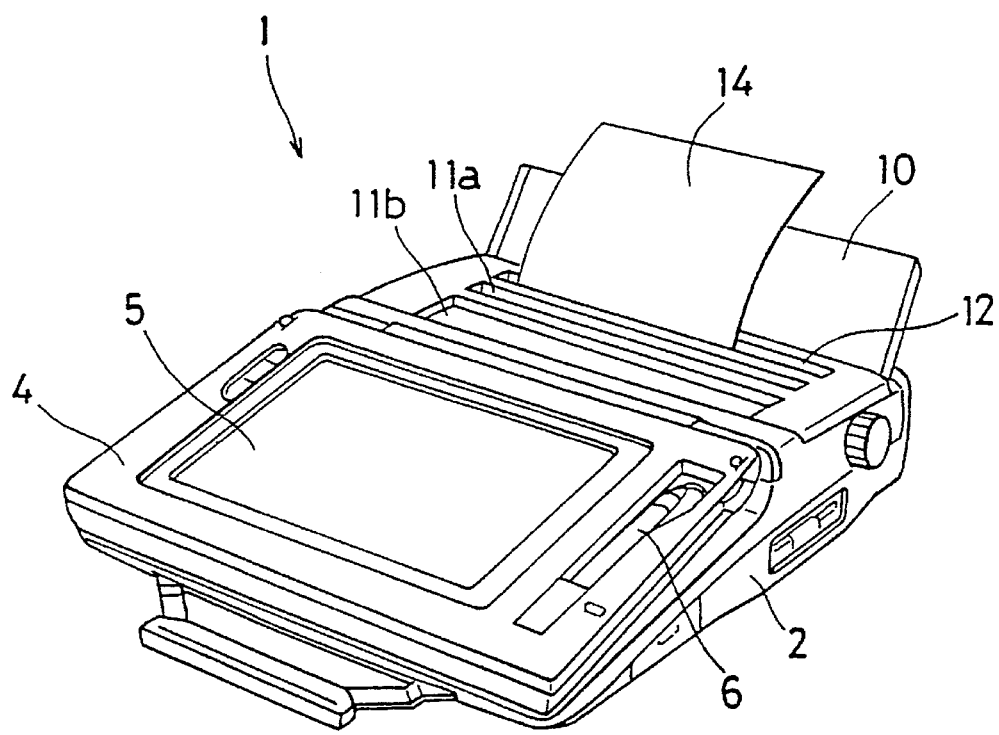
FIG. 5 is a perspective view which shows the state of an image on a document 14 being read by an image reading device 3 mounted on the body 2 of the information processing apparatus 1.

FIG. 5 shows the state of reading an image on a document 14 by the image reading device 3 mounted in the body 2 of the information processing apparatus 1. Reading of an image on a sheet-like document 14 may be carried out with the image reading device 3 while mounted in the body 2. Here, the document 14 to be read is inserted into the document insertion port 12.

In FIG. 5, the display section 4 is set, with its display panel 5 up, to cover the input key 9 region of the body 2. Since the display section 4 is set in this way with its display panel 5 up, the user may easily perform input with a pen 6 through the display panel 5.

Figure 6:
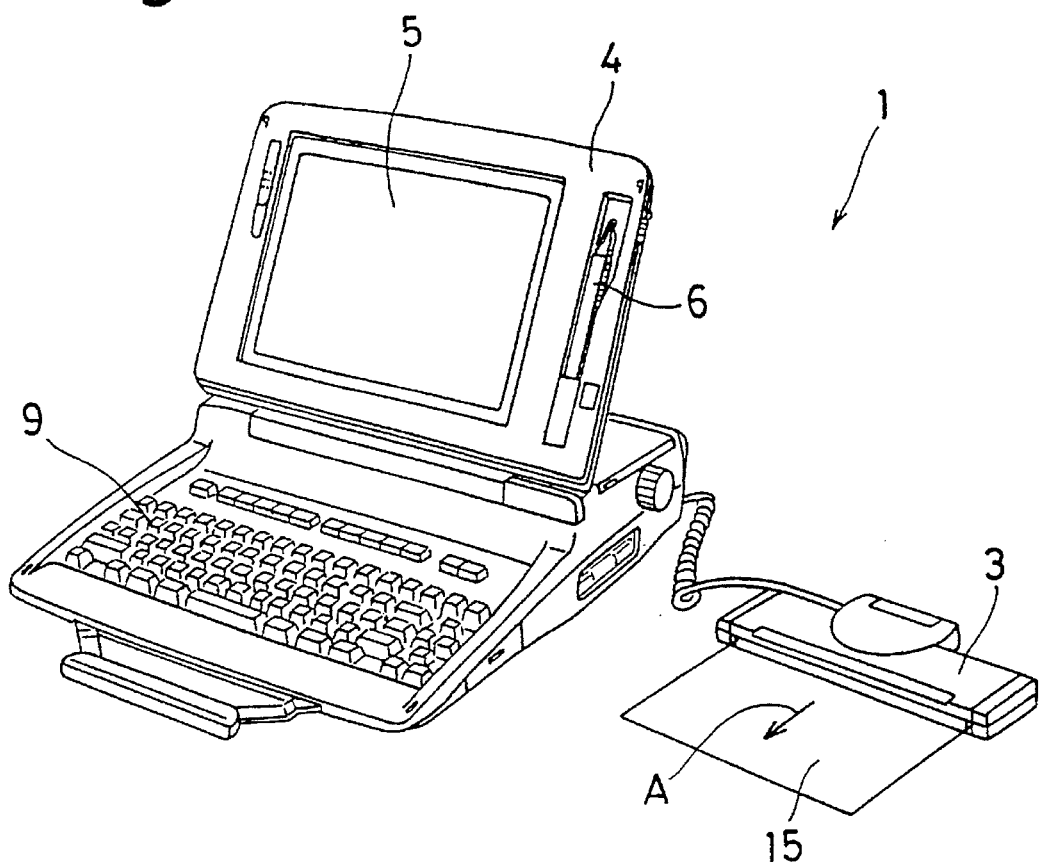
FIG. 6 is a perspective view which shows the state of an image on a document 15 being read by an image reading apparatus 3 demounted from the body 2 of the information processing apparatus 1.

FIG. 6 is a view which shows the state of reading an image on a document 15 by the image reading device 3 which is removed from the body 2 of the information processing apparatus 1. Reading of the image on the document 15 by the image reading device 3 may be performed by sliding the reading area of the document 15 in the direction of the arrow A, starting at the end which is opposite to the reading direction, that is, the direction indicated by the arrow A, while keeping the image reading device 3 in contact with the document 15.

FIG. 6 shows the state of reading from a sheet-like document 15, although the image reading device 3 may read an image on any type of document with a substantially plane reading surface, in addition to a sheet-like document 15. Illustrative examples of readable documents also include books, newspapers, etc., which cannot be inserted into the document insertion port 12.

Figure 7:
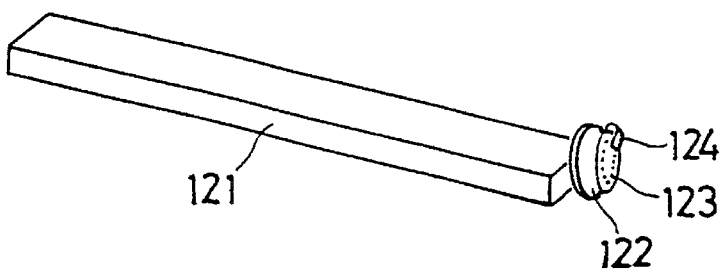
FIG. 7 is a diagram showing the rough arrangement of an image reading element 121, a roller 122, a slit plate 123 and a photosensor 124 which are mounted in the image reading device 3.

FIG. 7 is a schematic view of the configuration of an image reading element 121, a roller 122, a slit plate 123 and a photosensor 124 mounted in the image reading device 3. The image reading element 121 is provided inside the image reading device 3 along the longitudinal direction of the image reading device 3. The roller 122 is constructed so that a part of the circumference of the roller 122 protrudes from the underside of the image reading device 3, that is, from the undersurface in FIG. 6. The slit plate 123 which rotates coaxially and together with the roller 122 has a plurality of equally spaced slits arranged in its circumferential direction. The photosensor 124 is provided on the periphery of the slit plate 123 so as to sandwich the slit-arranged area of the slit plate 123.

As shown in FIG. 6, upon sliding of the image reading device 3 on the document 15, the roller 122 in contact with the document 15 starts to rotate, and the rotation of the roller 122 causes rotation of the slit plate 123. The rotation of the slit plate 123 is detected by the photosensor 124. Each time the roller 122 rotates a given distance, the photosensor 124 detects the slits of the slit plate 123 and outputs an encoder signal. This encoder signal is a digital signal designed so that its signal level is switched, for example, from a low level to a high level each time the photosensor 124 detects the respective slits of the slit plate 123; an MPU (microprocessor unit), which is described later, mounted in the body 2 of the information processing apparatus 1, reads the encoder signal and detects the distance of sliding of the image reading device 3.

The image reading element 121 optically reads the image on the document 15 through the reading glass 20 which is mentioned later and converts the read image into an electrical image signal for outputting. The image signal is inputted to the MPU via a scanner controller mounted in the body 2 which is described later. The MPU determines the timing for reading-in of the image signal on the basis of the distance traveled by the image reading device 3 which is indicated by the aforementioned encoder signal.

Figure 8:
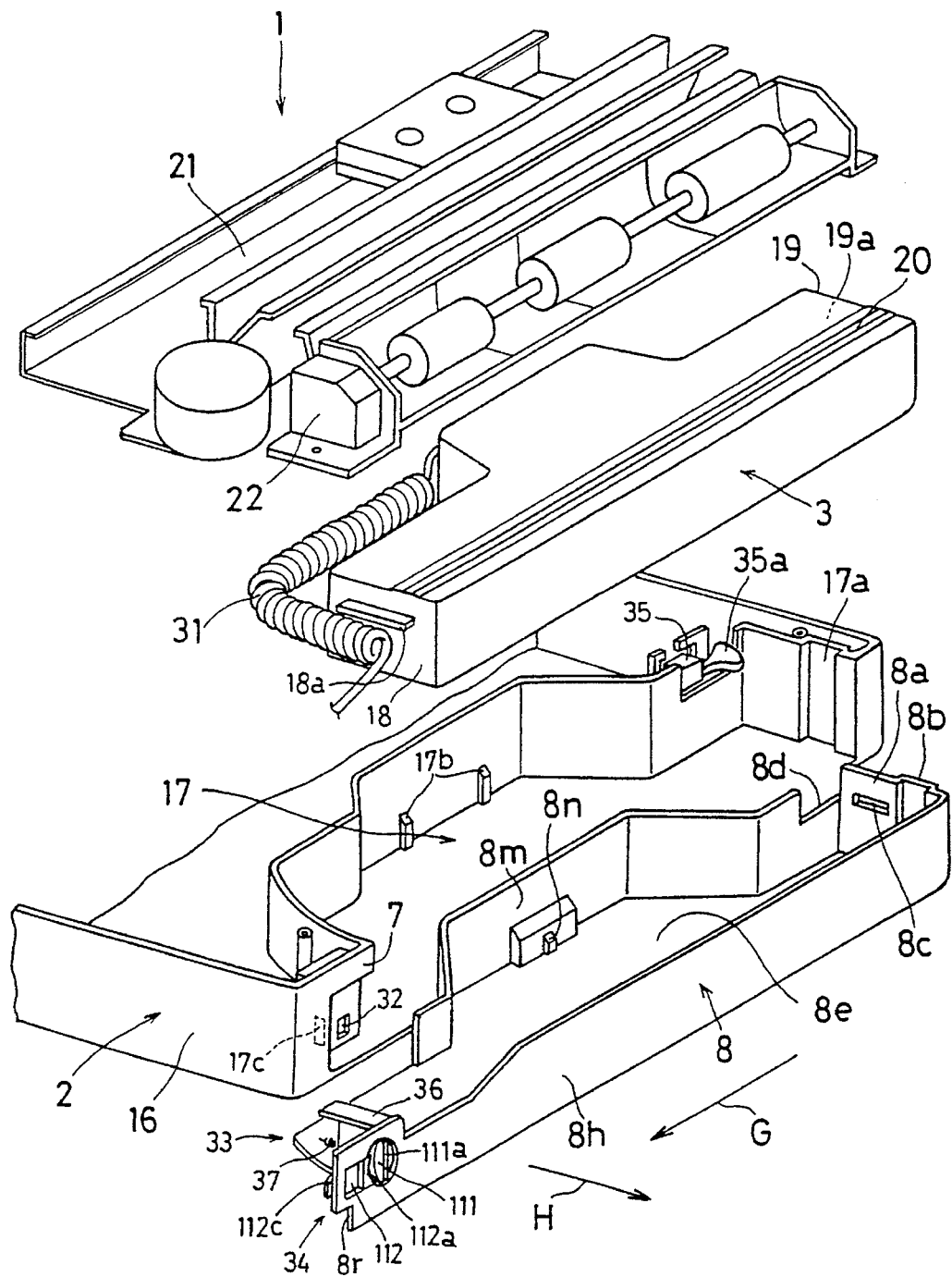
FIG. 8 is a fragmentary exploded perspective view of the inner configuration of the body 2 of the information processing apparatus 1.

FIG. 8 is a perspective view which shows the internal configuration of the body 2 of the information processing apparatus 1, with focus on the internal configuration of the tail end portion of the body 2. Provided inside the body 2 are a printer 21 and a feeding device 22 both of which are described later. In addition, the housing 16 of the body 2 provides the recess 17 for mounting the receiving box 8. The recess 17 opens at the back side 7 of the body 2 so as to allow the receiving box 8 to be mounted or removed through the back side 7 of the body 2.

The image reading device 3 comprises a relatively elongated rectangular body and a projection from the body, with flanges 18a and 19a provided on both end sides 18 and 19 in the direction of the arrow G, that is, the longitudinal direction of the body of the image reading device 3. The respective flanges 18a and 19a are displaced from the center toward the reading glass 20 end along the direction of the width of the image reading device 3, that is, the vertical direction in FIG. 8. The image reading device 3 and the body 2 are electrically connected to each other via the cable 31 for transmitting information on the image read by the image reading device 3, etc. The end (not shown) of the cable 31 at the side of the body 2 is connected to a connecting section 32 provided at the entrance area of the recess 17 shown in the left-hand part of FIG. 8 along the direction of the arrow G.

The receiving box 8 usually extends longer along the direction indicated by the arrow G in such a shape that the image reading device 3 is just fitted in the receiving box 8 in cases where the receiving box 8 receives the image reading device 3 with the reading glass 20 up. The side wall 8a of the receiving box 8 at the side opposite to the direction of the arrow G is provided with a protrusion 8b jutting in a direction opposite to the direction of the arrow G, and a groove 8c is formed inside the side wall 8a. Provided at the end of the receiving box 8 in the direction of the arrow G are a holding system which holds the image reading device 3, and a locking system 34 for fastening the receiving box 8 fitted in the recess 17 to the body 2.

In order to allow the receiving box 8 to be properly mounted in the recess 17, the portion of the recess 17 which faces the side wall 8a of the receiving box 8 is provided with a groove 17a into which the protrusion 8b jutting from the side wall 8a is fitted. Further, the recess 17 of the body 2 is provided with a detection switch 35 which is located so as to be into contact with the image reading device 3 and detects whether the image reading device 3 is received in place in the body 2 in cases where the image reading device 3 received in the receiving box 8 is mounted in the recess 17.

The detection switch 35 is designed to be switched from a cut-off state to a conductive state when the image reading device 3 is mounted in the body 2 and a detector piece 35a of the detection switch 35 is pressed by the image reading device 3 toward the inside of the body 2, that is, in a direction opposite to the direction of the arrow H. When the image reading device 3 is demounted from the body 2, the detector piece 35a of the detection switch 35 automatically moves toward the back side 7 of the body 2, that is, in the direction of the arrow H; thus switching from the conductive state to the cut-off state is accomplished with the detection switch 35.

A cut section 8d is formed in the portion of the receiving box 8 which faces the detection switch 35 so that the detection switch 35 does not cause conduction when an empty receiving box 8 or a receiving box 8 with no image reading device 3 mounted therein is mounted in the recess 17.

Figure 9:
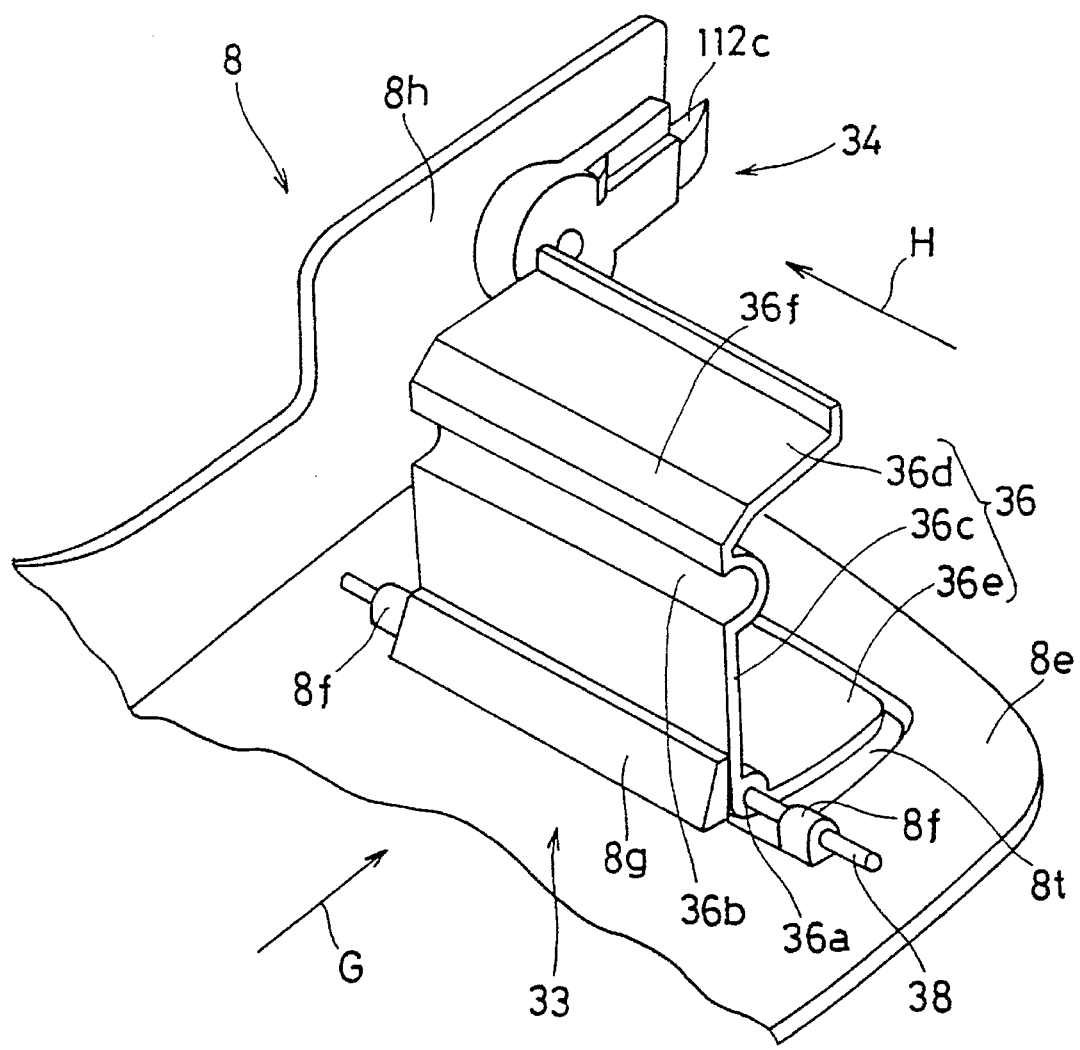
FIG. 9 is a perspective view showing the configuration of an end portion of a receiving box 8 in the direction indicated by the arrow G which is equipped with a holding system 33 and a locking system 34.
Figure 10:
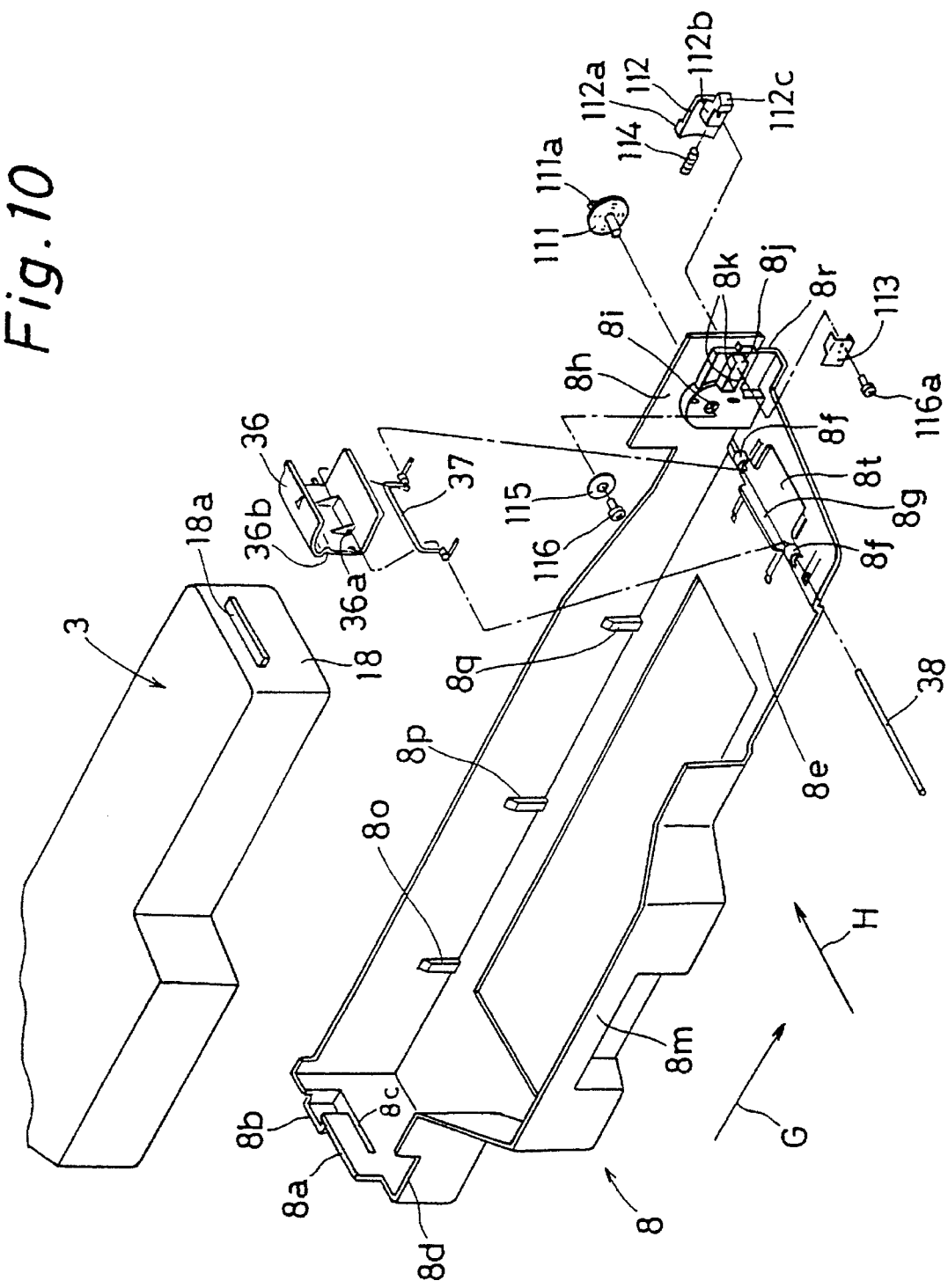
FIG. 10 is an exploded perspective view showing the configuration of the helding system 33 and the locking system 34 with which the receiving box 8 is provided.

FIG. 9 is a perspective view which shows the configuration of the end portion of the receiving box 8 in the direction of the arrow G which is provided with the holding system 33 and the locking system 34. FIG. 10 is a fragmentary perspective view which shows the configuration of the holding system 33 and the locking system 34. The holding system 33 is formed with a holding member 36, a spring member 37 and a shaft 38. The holding member 36 is a roughly block "c"-section structure, and is formed with a longitudinal plate 36c, a head plate 36d and a bottom plate 36e. A through-hole 36a for insertion of the shaft 38 is formed in the connecting section between the side wall 36c and the bottom plate 36e, and the side wall 36c has a groove 36b into which the flange 18a jutting from the image reading device 3 in the direction of the arrow G. In addition, the connecting section between the longitudinal plate 36e located above the groove 36b and the head plate 36d is formed with a guide slant face 36f which guides the flange 18a when the flange 18a is fitted into the groove 36b from above.

The spring member 37 is a coiled spring made of a single wire-like spring member coiled at two portions, and the intermediate portion between the two coiled portions is bent into the form of a block "c", while the end sides beyond the two coiled portions are bent at right angles to the coiled portions and angled at obtuse angles to the intermediate portion bent into a block "c". The shaft 38 extends through the two coiled portions of the spring member 37.

The portion of the receiving box 8e which receives the holding member 36 is provided with a pair of bearings 8f for anchoring the shaft 38. In order to ensure the inclination of the holding member 36 about the through-hole 36a in the direction of the arrow G, an opening 8t is provided in an area lying between the pair of bearings 8f and facing the bottom plate 36e of the holding member 36. A support plate 8g is formed on the periphery of the opening 8t opposite to the direction of the arrow G, that is, in the area which opposes the longitudinal plate 36c of the holding member 36.

Mounting of the holding member 36 in the receiving box 8 is accomplished in such a manner that the intermediate portion of the spring member 37 which has been bent into a block "c" presses the longitudinal plate 36c of the holding member 36 in a direction opposite to the direction of the arrow G, and thus completes insertion of the shaft 38 in the bearings 8f, the coiled portions of the spring member 37 and the through-hole 36a of the holding member 36.

Referring to FIG. 10, the locking system 34 is formed with a locking member 111, engaging member 112 and a fixing tool 113 and a compression spring 114. The locking member 111, as shown also in FIG. 8, is a system with a protrusion 111a formed on one side of a disk in its diametral direction and with a sleeve section on its other side. The engaging member 112, as shown also in FIG. 8, is constructed with a substantially flat plate, a protrusion 112a jutting vertically from one side of the plate in FIG. 10, and a guide protrusion 112b jutting from the other side of the plate and formed along a direction perpendicular to the aforementioned protrusion 112a. The front end 112c of the guide protrusion 112b in the direction of the arrow G juts more further than the tip of the plate in the direction of the arrow G.

The fixing tool 113 is constructed by bending a plate-like member so that its cross section is shaped like a block "c".

The locking member 111 and the engaging member 112 are attached to the end wall 8h of the receiving box 8 in the direction of the arrow H. Formed at the end of the end wall 8h in the direction of the arrow G are an opening 8i into which the shaft of the locking member 111 is to be inserted in a rotatable manner, and a guide opening 8j into which the guide protrusion 112a of the engaging member 112 is inserted in a slidable manner in a transverse direction, that is, in the direction of the arrow G, and in a direction opposite to the direction of the arrow G. The guide opening 8j is located downstream from the opening 8i in the direction of the arrow G.

The portion inside the end wall 8h which faces the guide opening 8j is provided with a pair of guide plates 8k formed on the upper and lower sides of the guide openings 8j which extend along the guide opening 8j.

Mounting of the locking member 111 in the receiving box 8 is accomplished by inserting the shaft of the locking member 111 from outside the receiving box 8 and screwing a thread 116 in a screw hole provided in the shaft through a washer 115, from inside the receiving box 8.

Mounting of the engaging member 112 in the receiving box 8 is carried out as follows. First, the guide protrusion 112b of the engaging member 112 is inserted into the guide opening 8j from outside the receiving box 8, with the front end 112c of the guide protrusion 112b oriented in the direction of the arrow G. Then, the compressed compression spring 114 is inserted into the guide opening 8j from inside the receiving box 8 so that the two end faces of the compression spring 114 press against both the end face of the guide opening 8j which is opposite to the direction of the arrow G and the end face of the guide protrusion 112b which is opposite to the direction of the arrow G.

In addition, while pressed, the fixing tool 113 is attached to the receiving box 8 from its inside so that the opposite parts of the block "c"-shaped bent fixing tool 113 straddle the upper and lower guide plates 8k vertically, and the fixing tool 113 and the engaging member 112 are secured by the screw 116a.

With the engaging member 112 attached to the receiving box 8 in this manner, the engaging member 112 is pressed toward the direction of the arrow G by the resilience of the compression spring 114, in which state the front end 112c of the guide protrusion 112b juts further than the end of the end wall 8h in the direction of the arrow G.

Figure 11:
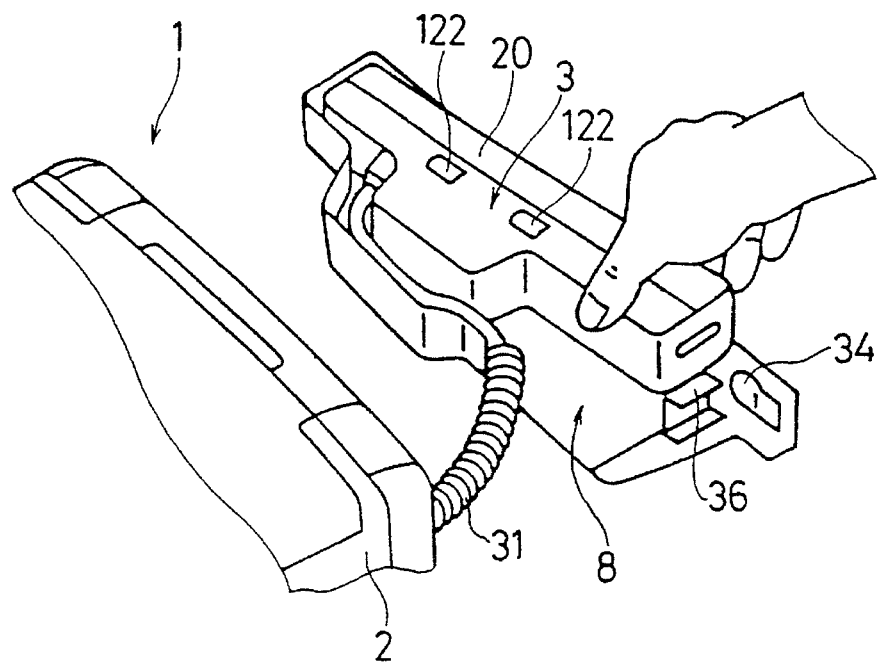
FIG. 11 is a view showing procedures for receiving the image reading device 3 in the receiving box 8.

FIG. 11 is a view illustrating the procedures for mounting the image reading device 3 in the receiving box 8. First, as shown in FIG. 11, the image reading device 3 is held with the hand, with the reading glass 20 side up, and the flange 19a on the right-hand side of the image reading device 3, that is, in the upper left portion of FIG. 11, is fitted in the groove 8c of the receiving box 8.

After the flange 19a has been fitted in the groove 8c, the flange 18a on the right-hand side of the image reading device 3, that is, in the lower right portion of FIG. 11, is fitted in the groove 36b of the holding member 36 by pressing the left side of the image reading device 3 downward. In the process of fitting the flange 18a into the groove 36b, as the flange 18a moves downward by being guided by the guide slant face 36f of the holding member 36, the holding member 36 inclines toward the direction of the arrow G, and the flange 18a is easily fitted in the groove 36b in this way.

Figure 12:
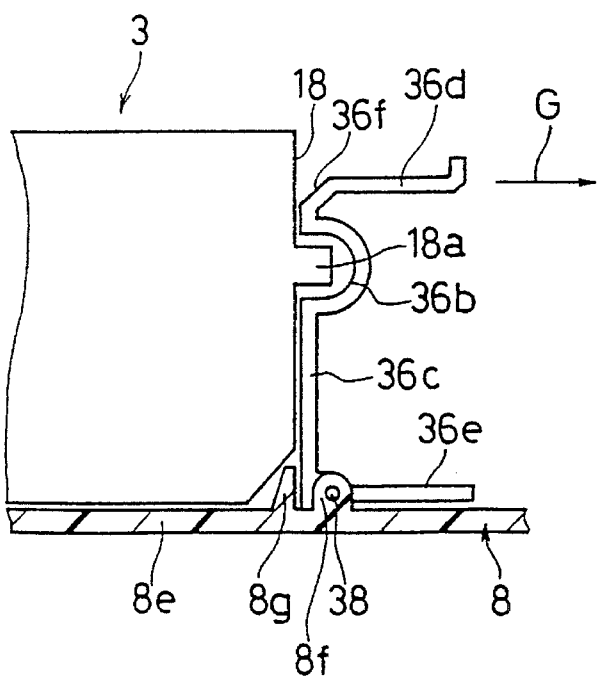
FIG. 12 is a view showing the state of a flange 18a of the image reading apparatus 3, fitted in a groove 36b of the holding member 36.

FIG. 12 is a view showing the state of the flange 18a of the image reading device 3 which is fitted in the groove 36b of the holding member 36. Removal of the image reading device 3 from the receiving box 8 may be accomplished by pressing the head plate 36d of the holding member 36 in the direction of the arrow G to incline the holding member 36 in the direction of the arrow G, thereby separating the groove 36b from the flange 18a.

The positioning of the image reading device 3 mounted in the receiving box 8 with respect to the receiving box 8 is performed as follows. Referring to FIG. 8, the positioning of the image reading device 3 in the direction of the arrow G and in a direction opposite to the direction of the arrow G is accomplished in such a manner that while the respective flanges 18a and 19a of the image reading device 3 are fitted in the counterpart grooves 8c and 36b, the end face 18 of the image reading device 3 in the direction of the arrow G is pressed in a direction opposite to the direction of the arrow G by the holding member 36 which has been pressed by the spring member 37, and the image reading device 3 is sandwiched between the longitudinal plate 36c of the holding member 36 and the side wall 8a.

Referring to FIG. 8 and FIG. 10, the positioning of the image reading device 3 in the direction of the arrow H and in a direction opposite to the direction of the arrow H is conducted with positioning protrusions 8n–8q provided inside the receiving box 8. The positioning protrusion 8n juts out in the direction of the arrow H from the end wall 8m of the receiving box 8 which is located upstream in the direction of the arrow H. The respective positioning protrusions 8o–8q jut out in a direction opposite to the direction of the arrow H from the end wall 8h which is located downstream in the direction of the arrow H. The respective positioning protrusions 8n–8q are provided in the lower portions of the end walls 8m and 8h.

When the image reading device 3 is mounted in the receiving box 8, the image reading device 3 is sandwiched between the positioning protrusion 8n and the positioning protrusions 8o–8q, and positioning the image reading device 3 is carried out. In order to insert the image reading device 3 into the receiving box 8 without difficulty, the upsides of the respective positioning protrusions 8n–8q incline toward the inside of the receiving box 8.

Next, an explanation will be given regarding the procedures for mounting the receiving box 8 in the body 2. First, the protrusion 8b of the receiving box 8 is fitted in the groove 17a of the body 2, Next, the left side of the receiving box 8, that is, the downstream side of the receiving box 8 in the direction of the arrow G, is inserted into the inside of the recess 17, that is, in the direction opposite to the direction of the arrow H. After mounting the receiving box 8 in the recess 17, now referring to FIG. 8, the front end of the guide protrusion 112b of the engaging member 112 is fitted in the opening 17c provided in the wall which is located in the entrance area downstream in the direction of the arrow G and is parallel to the direction of the arrow H, and the receiving box 8 is secured to the body 2.

A part of the front end 112c of the guide protrusion 112b of the engaging member 112 which is orientated opposite to the direction of the arrow H, has a slant surface inclining in the direction of the arrow H so that the front end 112c is fitted in the opening 17c without difficulty when it is attempted to mount the receiving box 8 in the recess 17.

The receiving box 8 may be removed from the body 2 by using a finger to slide the engaging member 112 in the direction opposite to the direction of the arrow G against the resilience of the compression spring 114 to release the engagement between the front end 112c of the engaging member 112 and the opening 17c.

When the receiving box 8 is mounted in the body 2, the locking system 34 may be locked by rotating the protrusion 112a of the locking member 111 shown in FIG. 8 from the vertical state to the horizontal state. In this locked state, the end face of the protrusion 112a which is located downstream in the direction of the arrow G is in contact with the plate portion of the engaging member 112 and the end face of the protrusion 112a which is located upstream in the direction of the arrow G so that the engaging member 112 does not slide in a direction opposite to the direction of the arrow G.

On the other hand, in cases where the protrusion 112a is orientated vertically as shown in FIG. 8 and thus in the release position, the engaging member may move onto the disk of the locking member 111 so that the engaging member 112 may be slid in a direction opposite to the direction of the arrow G.

In the locked state with the locking member 111, even if the protrusion 112a of the engaging member 112 happens to come into contact with some other object while the information processing apparatus 112 is being carried, dislocation of the image reading device 3 and the receiving box 8 from the body 2 may be prevented.

The receiving box 8 mounted in the body 2 may be positioned with respect to the body 2 as follows. First, the positioning in the direction of the arrow G and in a direction opposite to the direction of the arrow G, that is, the positioning in the longitudinal direction of the receiving box 8, is performed by matching the longitudinal size and shape of the recess 17 of the body 2 with the longitudinal size and shape of the receiving box 8. Next, the positioning in the direction of the arrow H and in a direction opposite to the direction of the arrow H, that is, the positioning in the direction of the depth of the recess, is conducted with the two positioning protrusions 17b provided on the wall of the recess 17 of the body 7 with reference to FIG. 8. The positioning protrusion 17b is located to face the end wall 8m of the receiving box 8 and juts from the inner wall of the recess 17 in the direction of the arrow H. As described above, the size of the positioning protrusion 17b in the direction of the arrow H is designed so that the positioning protrusion 17b comes into contact with the end wall 8m at the same time the protrusion 8b of the receiving box 8 is fitted in the groove 17a and the front end 112c of the engaging member 112 is fitted in the opening 17c.

In the present embodiment, the aforementioned positioning of the receiving box 8 in the direction of the depth is carried out with the positioning protrusion 17b, nevertheless, the positioning of the receiving box 8 may be carried out by providing a plate spring which presses the end wall 8m of the receiving box 8 in the direction of the arrow H, at the position of the positioning protrusion 17b in the recess 17 of the body 2, instead of the positioning protrusion 17b. Pressing by the plate spring serves to avoid flaws in the fit section between the groove 17a and the protrusion 8b and in the fit section between the front end 112c of the engaging member 112 and the opening 17c, and therefore reliable positioning of the receiving box 8 may be accomplished in the direction of its depth.

The receiving box 8 can also be mounted in the body 2 if it is empty, that is. does not contain the image reading device 3. In cases where the empty reading device 8 is mounted in the box 2, the cable 31 is pulled out of the body 2 via the connecting section 32 in the recess 17 of the body 2 and a cut 8r provided at the end of the end wall 8h of the receiving box 8 in the direction of the arrow G.

Figure 13:
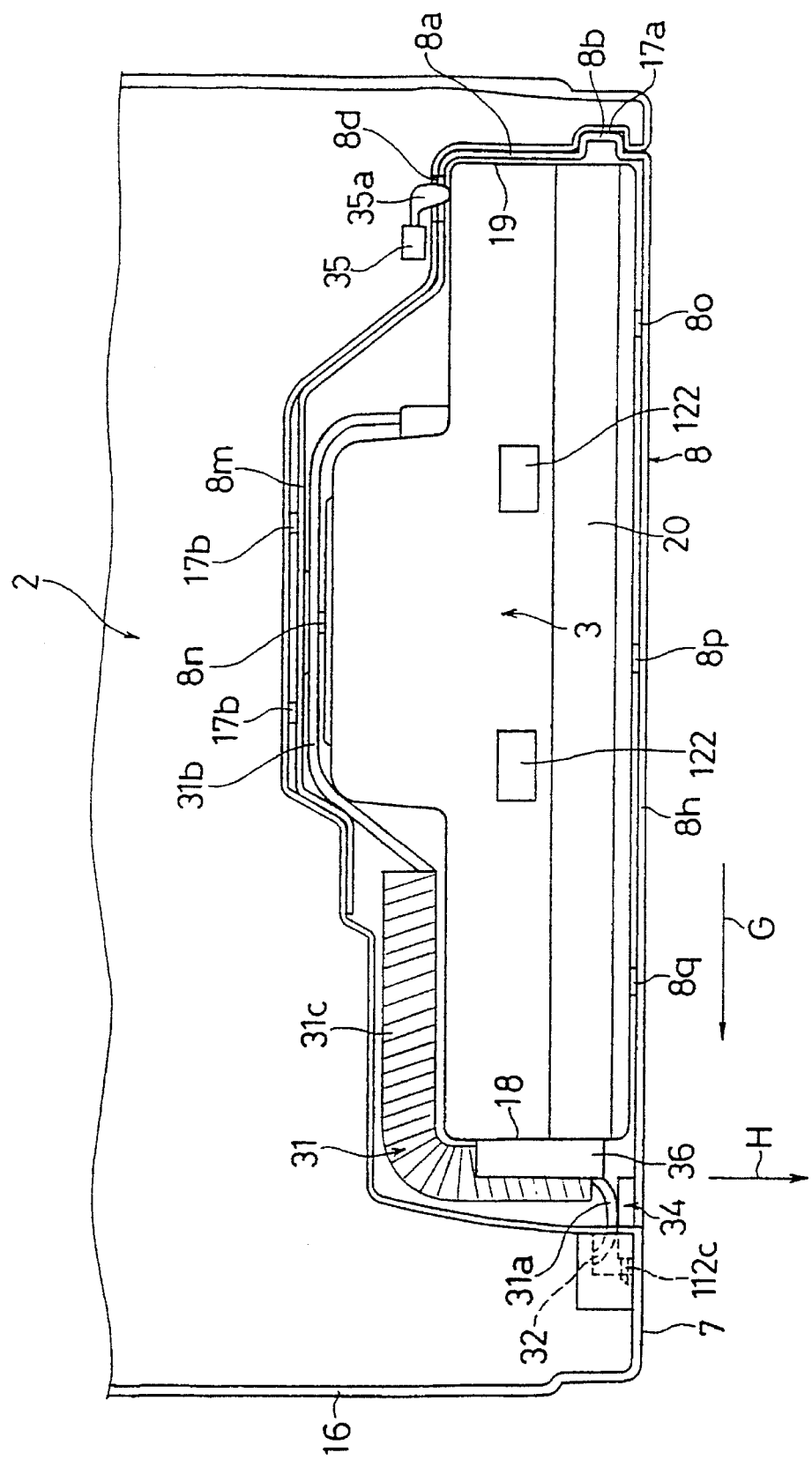
FIG. 13 is a plan view showing the state of the image reading device 3 and receiving box 8 mounted in the body 2.

FIG. 13 is a plan view which shows the state of the image reading device 3 and the receiving box 8 mounted in the body 2. The cable 31 is flexible and comprises straight portions 31a and 31b at the two ends and the intermediate curled portion 31c. When the image reading device 3 and the receiving box 8 are mounted in the body 2, the straight portion 31b of the cable 31 at the side of the image reading device 3 is mounted between the protrusion jutting in a direction opposite to the direction of the arrow H, from the end face of the image reading device 3 which is located upstream in the direction of the arrow H, and the end wall 8m of the receiving box 8. The curled portion 31c of the cable 31 is mounted in a space surrounded by the non-jutting end face of the image reading device 3 which is located upstream in the direction of the arrow H, the end face 18 of the image reading device 3 which is located downstream in the direction of the arrow G and the inner wall of the recess 17 of the body 2. The straight portion 31a of the cable 31 at the side of the body 2 is led to the connecting section 32 of the body 2.

Here, the straight portion 31b of the cable 31 at the side of the image reading device 3 is mounted over the positioning protrusion 8n provided on the end wall 8m of the receiving box 8, and thus the cable 31 does not prevent the positioning of the image reading device 3 with the aforementioned positioning protrusion 8n.

Figure 14:
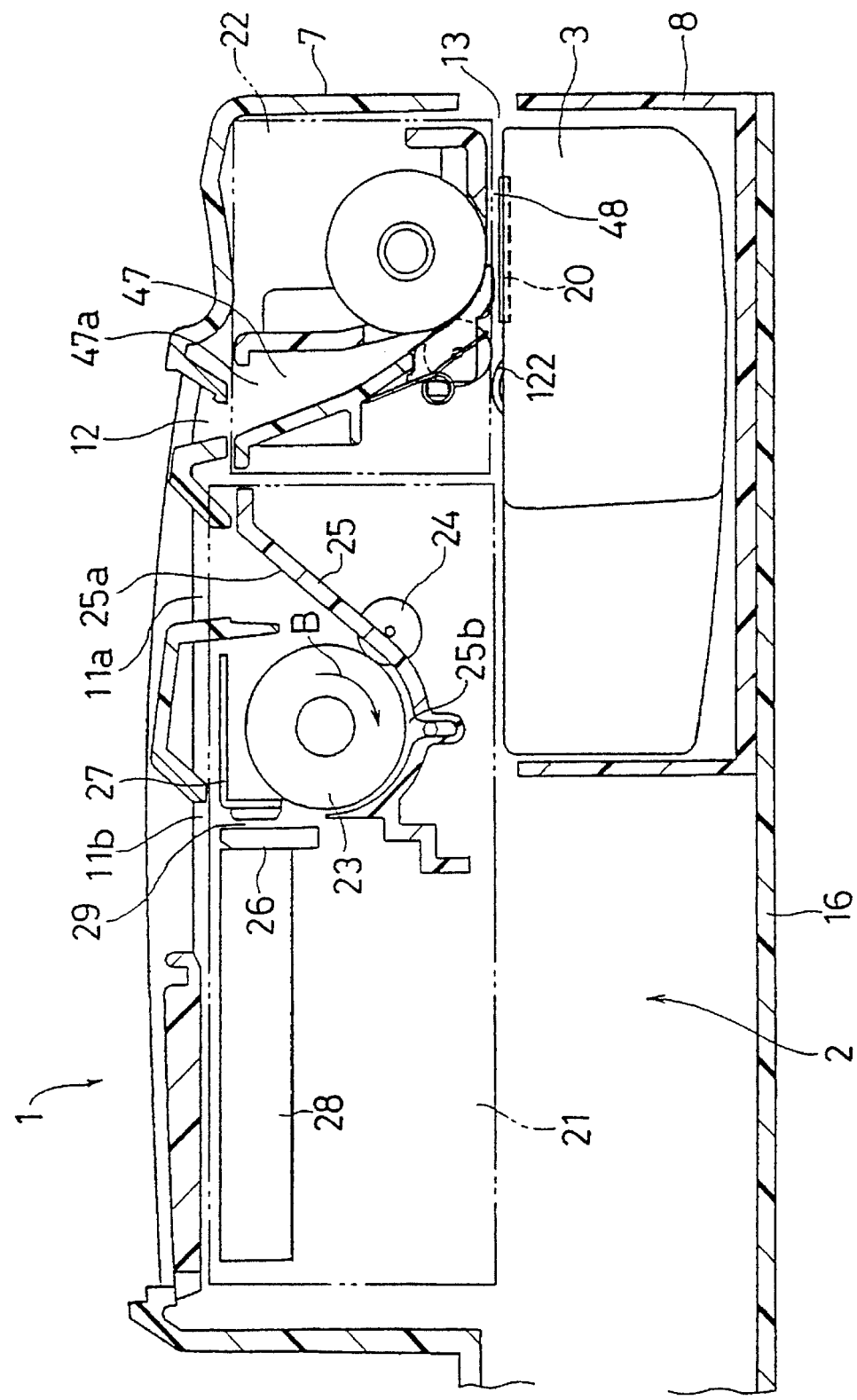
FIG. 14 is a fragmentary horizontal sectional view of the body 2 of the information processing apparatus 1.

FIG. 14 is a fragmentary horizontal sectional view of the body 2 of the information processing apparatus 1, particularly the partial configuration of the tail end portion of the body 2. Provided inside the tail end portion of the body 2 are a printer 21, a feeding device 22 and an image reading device 3 received in the receiving box 8.

The image reading device 3 is provided with the reading glass 20 side up. Over the image reading device 3 there is provided the document feeding device 22 above the reading glass 20 side of the image reading device 3. The printer 21 is located in front of the feeding device 22, that is, in the left-hand part of FIG. 14.

The printer 21 is comprised of a feeding roller 23, a pinch roller 24, a roller frame 25, a print-head 26, a bed-plate 27 and an ink ribbon cartridge 28.

The recording paper inserted through the paper inserting port 11a is guided along the slant surface 25a of the roller frame 25 and reaches the contact position between the feeding roller 23 and the pinch roller 24. The recording paper which has reached the contact position is sandwiched between the feeding roller 23 and the pinch roller 24 and fed along the feeding passage 25b formed by the feeding roller 23 and the roller frame 25 as the feeding roller 23 rotates in the direction of the arrow B. During this feeding, the direction of movement of the recording paper changes from the slanting, downward direction to the horizontal direction, then from the horizontal direction to the slanting, upward direction, and further from the slanting, upward direction to the upward direction.

The recording paper, whose direction of movement has changed to an upward direction during feeding, is led to a printing station 29 which is located under the paper outlet 11b and where the print-head 26 is faced with the bed-plate 27, and the recording paper which has passed the printing station 29 is ejected outside the body 2 through the paper outlet 11b.

As the recording paper passes through the printing station 29, the recording paper is printed by the print-head 26. Printing by the print-head 26 is conducted by heating the print-head 26 while pressing an ink ribbon pulled out from the ink ribbon cartridge 28 against the paper by the print-head 26, thereby melting and adhering the ink applied to the ink ribbon onto the recording paper.

The printing operation of the print-head 26 includes up/down operation and lateral movement operation as well as the heating operation. The up/down operation includes operation of a drive section (not shown) to press the print-head against the recording paper or separate the print-head from the recording paper. In the "up" state, the print-head 26 is separated from the recording paper, whereas the print-head 26 is pressed against the recording paper in the "down" stale. The lateral movement operation is the operation of the drive section (not shown) to move the printhead 26 in a lateral direction, that is, in a direction perpendicular to the plane of the recording paper in FIG. 14.

Figure 15:
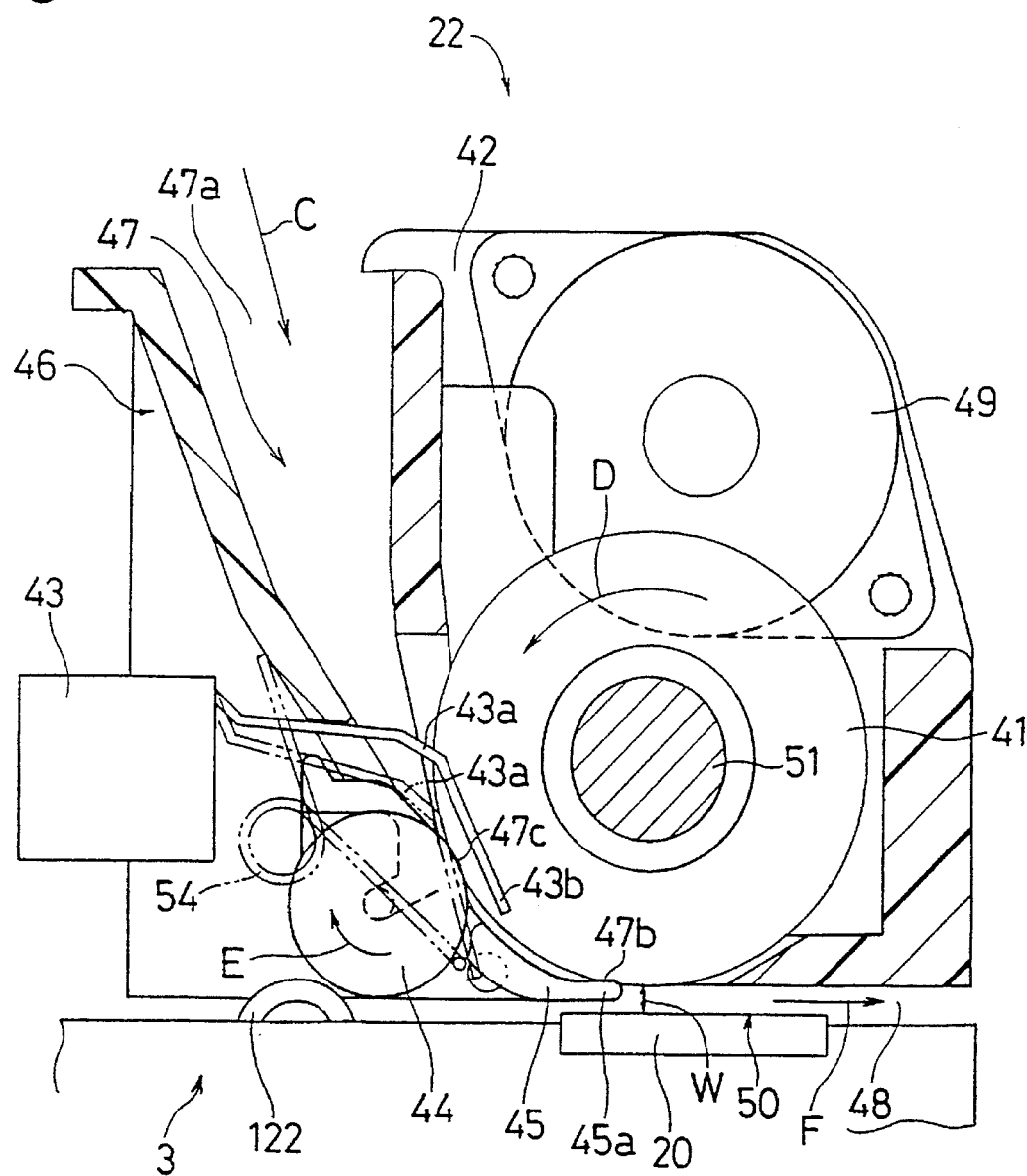
FIG. 15 is a schematic cross-sectional view showing the configuration of a feeding device 22.

FIG. 15 is a schematic cross sectional view which shows the configuration of the feeding device 22. The feeding device 22 is comprised of a main frame 42 equipped with a feeding roller 41 and a sub frame 46 equipped with a document detection switch 43, a pinch roller 44 and a retaining guide 45 which is a guide member.

The main frame 42 and the sub frame 46 constitute a guide passage 47. The guide passage 47 gradually tapers from the top to the bottom, and also curves, from the top to the bottom, from the slanting direction to the horizontal direction, that is, from the direction off to the lower right part to the right part of FIG. 15. The opening 47a at the upper end of the guide passage 47 communicates with the document insertion port 12 provided in the body 12, as shown in FIG. 14.

On the other hand, the feeding roller 41 and the front end 45a of the retaining guide 45 are in contact with each other at the terminal 47b at the side of the guide passage 47 which is opposite to the opening 47a. The terminal 47b of the guide passage 47 is connected to the left side of the feeding passage 48 in FIG. 15 which is formed between the bottom surface of the main frame 42 and the surface on which the reading glass 20 of the image reading device 3 is provided. The right side of the feeding passage 48 is connected to the outlet 13 provided in the back side 7 of the body 2, as shown in FIG. 14.

When a document is inserted into the guide passage 47 through the document insertion port 12 of the body 2, as indicated by the arrow C, the document comes into contact with the detector piece 43a of the document detection switch 43. The document in contact with the detector piece 43a falls down due to its own weight while pressing the detector piece 43a downward as indicated by the alternate long and two short dashes line, and this state continues until the document reaches the contact position 47c between the feeding roller 41 and the pinch roller 44 and the feeding rollers 41 are rotated by a motor 49.

The detector piece 43a remains in the pressed state until the tail end of the document in the direction of feeding, that is, the upper end in FIG. 15, has passed across the front end 43b of the detector piece 43a. After the tail end of the paper has passed across the front end 43b of the detector piece 43b, the detector piece 43a automatically moves upward and is restored to its original state as indicated by the solid line.

When the feeding roller 41 is rotated by the motor 49 in the direction of the arrow D, the pinch roller 44 is rotated in the direction of the arrow E correspondingly, and the front end of the document, that is, the lower end shown in FIG. 15, is caught at the contact position 47c between the paper feeding roller 41 and the pinch roller 44. The caught document is fed through the guide passage 47 to reach the front end 43b of the detector piece 43a, and then fed to the terminal 47b of the guide passage 47, and thus is led to the feeding passage 48.

The document led to the feeding passage 48 is further fed in the direction of the arrow F and reaches the reading position 50 on the reading glass 20 of the image reading position 3, wherein the image on the underside of the document, that is, the image on the side facing the reading glass 20, is read by the image reading device 3 as the document is fed.

The image-read document is fed through the feeding passage 48 and ejected outside through the outlet 13 of the body 2.

Figure 16:
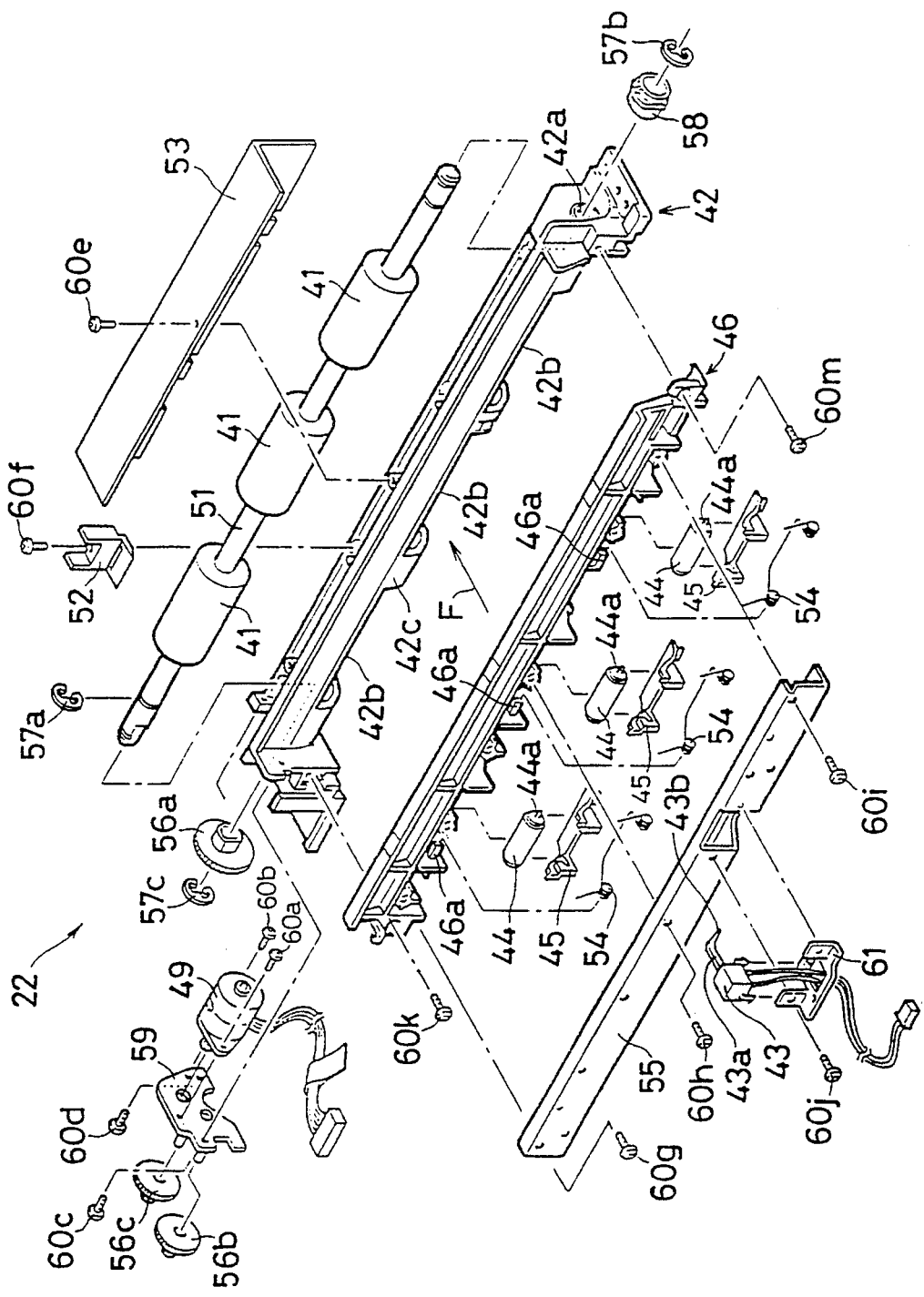
FIG. 16 is a fragmentary cross-sectional view showing the configuration of the feeding device 22.

FIG. 16 is a fragmentary perspective view which shows the configuration of the feeding device 22. The feeding device 22 comprises a main frame 42 and a sub frame 46. The main frame 42 is equipped with a motor 49, three feeding rollers 41, a shaft 51, a guide 52, a lightproof plate 53 etc. The sub frame 46 is equipped with three pinch rollers 44, three retaining guide 44, three spring members 54, a document detection switch 43, covering member 55, etc.

The shaft 51 is inserted in the three paper feeding rollers 41, and the respective paper feeding rollers 41 are fixed around the shaft 51 at equal spaces in the direction of the axis of the shaft 51. The main frame 42 is elongated in a direction perpendicular to the direction of feeding of the document as indicated by the arrow F. Axial openings 42a for fixing the shaft 51 are provided at the two ends of the main frame 42. Further, the main frame 42 is provided with openings 42b which face the respective associated feeding rollers 41 when the two ends of the shaft 51 are inserted in the axial openings 42a.

Then the two ends of the shaft 51 are inserted in the respective axial openings 42a of the main frame 42, E rings 57a and 57b are fitted over the shaft 51 at positions outside the two axial openings 42a, and thus the shaft 51 is fixed in the main frame 42 in a rotatable manner. Bearings 58 intervene between the two axial openings 42a and the shaft 51. A gear 56a is fitted over one end of the shaft 51 fixed in the main frame 42, at a position outside the E ring 57a. An E ring 57c is fitted over the shaft at a position outside the gear 56a, and the gear 56a is fixed around the shaft.

In this state of the shaft 51 mounted in the main frame 42, the shaft 51 faces the wall of the main frame 42 downstream in the direction of the arrow F, that is, the wall not facing the sub frame 46, and the circumference each of the paper feeding rollers 41 somewhat juts from the wall 42c of the main frame 42 which locates upstream in the direction of the arrow F, via the openings 42b of the main frame 42.

The paper feeding rollers 41 are driven to rotate by the motor 49 via the shaft 51, gear 56a and two deceleralor gears 56b and 56c. The motor 49 and the gears 56b and 56c are attached to the mounting member 59. The mounting member 59 is attached to the main frame 42 with bolts 60c and 60d. The motor 49 is fixed to the mounting member 59 with bolts 60a and 60b.

An L-section lightproof plate 53 is fixed, with a bolt 60e, to the main frame which is mounted with the feeding rollers 41, so as to cover the region of the feeding rollers 41. A guide 52 is affixed to the main frame 42 with a bolt 60f.

The sub frame 46 is elongated in a direction perpendicular to the direction of the arrow F. Parts of the wall of the sub frame 46 downstream in the direction of the arrow F, that is, the wall facing the main frame 42, which face the feeding rollers 41 are equipped with three pinch rollers 44 and retaining guides 45 which correspond to the respective associated feeding rollers 41. The pinch rollers 44 are constructed in such a manner that protrusions 44a provided at the two axial ends are fitted in the recess grooves of retaining guides 45 which will be described later, and held by the retaining guides 45 in a rotatable manner.

The spring member 54 is shaped like the aforementioned spring member 37, and the block "c"-shaped bent portion is affixed to the sub frame 46 while pressing, diagonally above, the wall of the retaining guide 45 which is upstream in the direction of the arrow F. The spring members 54 may be mounted in the sub frame 46 by fitting the two coiled portions of the spring members 54 over supporting protrusions 46a provided on the wall of the sub frame 46 which is upstream in the direction of the arrow F.

After the pinch rollers 44, retaining guides 45 and spring members 46 are mounted in the sub frame 46, a roughly flat plate-like covering member 55, which covers the region including the pinch rollers 44, retaining guides 45 and spring members 54, is affixed with bolts 60g–60i to the wall of the sub frame 46 which is downstream in the direction of the arrow F. This covering member 55 protects the pinch rollers 44, etc. and reinforces the sub frame 46.

The covering member 55 is fitted, with two bolts 60j, with a mounting member 61 which is to be mounted with the document detection switch 43. The portions of the sub frame 46 and the covering member 55, which are to be mounted with the document detection switch 43, are provided with a through-hole which extends in the direction of the arrow F; the detector piece 43a of the document detection switch 43 juts through this hole, from the wall of the sub frame 46 which is downstream in the direction of the arrow F.

The two ends each of the main frame 42 and the sub frame 46 are fixed with bolts 60k and 60m.

Figure 17:
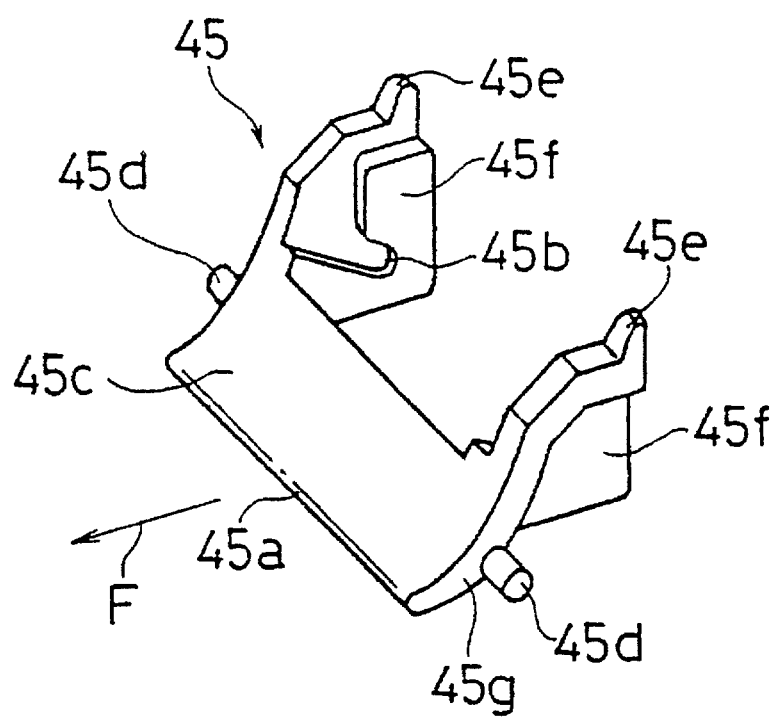
FIG. 17 is a perspective view of a retaining guide 45, when viewed from above.

FIG. 17 is a perspective view of the retaining guide 45 when viewed from above. The retaining guide 45 is comprised of two substantially opposite longitudinal plates 45f which are connected with an inclined plate 45g. The guide surface 45c, that is, the wall of the inclined plate 45g which is downstream in the direction of the arrow F and faces the circumference of the paper feeding rollers 41, are concaved so as to substantially match the circumference of the paper feeding roller 41. The front end 45a of the inclined plate 45g in the direction of the arrow F is in contact with the circumference of the feeding roller 41. The two ends of the inclined plate 45g in the direction perpendicular to the direction of the arrow F are provided with protrusions 45d jutting out in opposite directions, respectively.

The opposite sides of each longitudinal plate 45f are provided with recess grooves 45b which open substantially in the direction of the arrow F. The respective protrusions 44a of the aforementioned pinch rollers 44 are fitted in the recess grooves 45b in the direction opposite to the direction of the arrow F. With the pinch rollers 44 held by the retaining guides 45 in this way, the circumference of the pinch rollers juts somewhat from the upper ends of the guide surfaces 45c.

Engaging pieces 45e which jut upward are formed at the upper ends of the respective longitudinal plates 45f.

Figure 18:
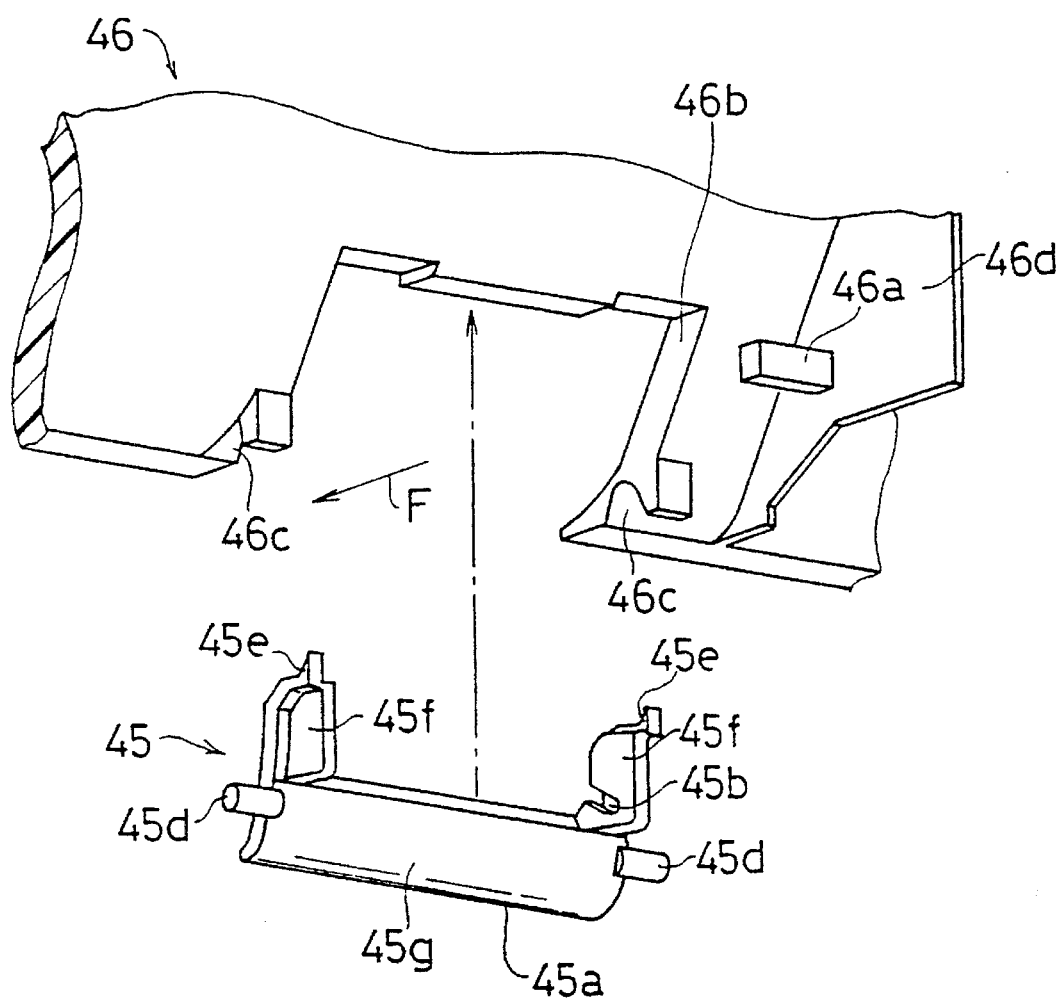
FIG. 18 is a perspective view showing a section of a sub frame 46 in which the retaining guide 45 is to be mounted, when viewed from below.

FIG. 18 is a perspective view showing a section of the sub frame 46 in which the retaining guide 45 is to be mounted, when viewed from below. Each of the sections at the lower end of the sub frame 46 is provided with a roughly square cut section 46b. Opposite walls of the cut section 46b at the lower end of the sub frame 46 at the side of the wall which is upstream in the direction of the arrow F are provided with a pair of recess grooves 46c which open downward. Provided on the wall of the sub frame 46 which is upstream in the direction of the arrow F are a plurality of ribs 46d which jut out in the direction opposite to the direction of the arrow F. The ribs 46d are provided at least for each cut section 46b, on both sides of each cut section 46b. The aforementioned supporting protrusions 46a for supporting the spring members 54 are provided in such a manner that they jut out in a direction perpendicular to the direction of the arrow F and in a direction of both approaching each other, from the ribs 46d provided on both sides of the cut sections 46b. Here, in FIG. 18, another rib 46d to be located to the right of the cut section 46b in FIG. 18 is omitted, for easier understanding of the peripheral shape of the cut section 46b.

The retaining guide 45 may be mounted in the sub frame 46 by inserting the retaining guide 45 into the cut section 46b from below. Here, the respective protrusions 45d of the retaining guide 45 are fitted in the recess grooves 46c of the sub frame 46. In addition, the respective engaging pieces 45e of the retaining guide 45 are in contact with the wall at the upper end of the cut section 46b which is upstream (opposite to) in the direction of the arrow F. The retaining guide 45 is rotatable about the protrusion 45d fitted in the recess groove 46c in such direction that the engaging piece 45e moves away from the wall of the sub frame 46 which is upstream in the direction of the arrow F.

Figure 19:
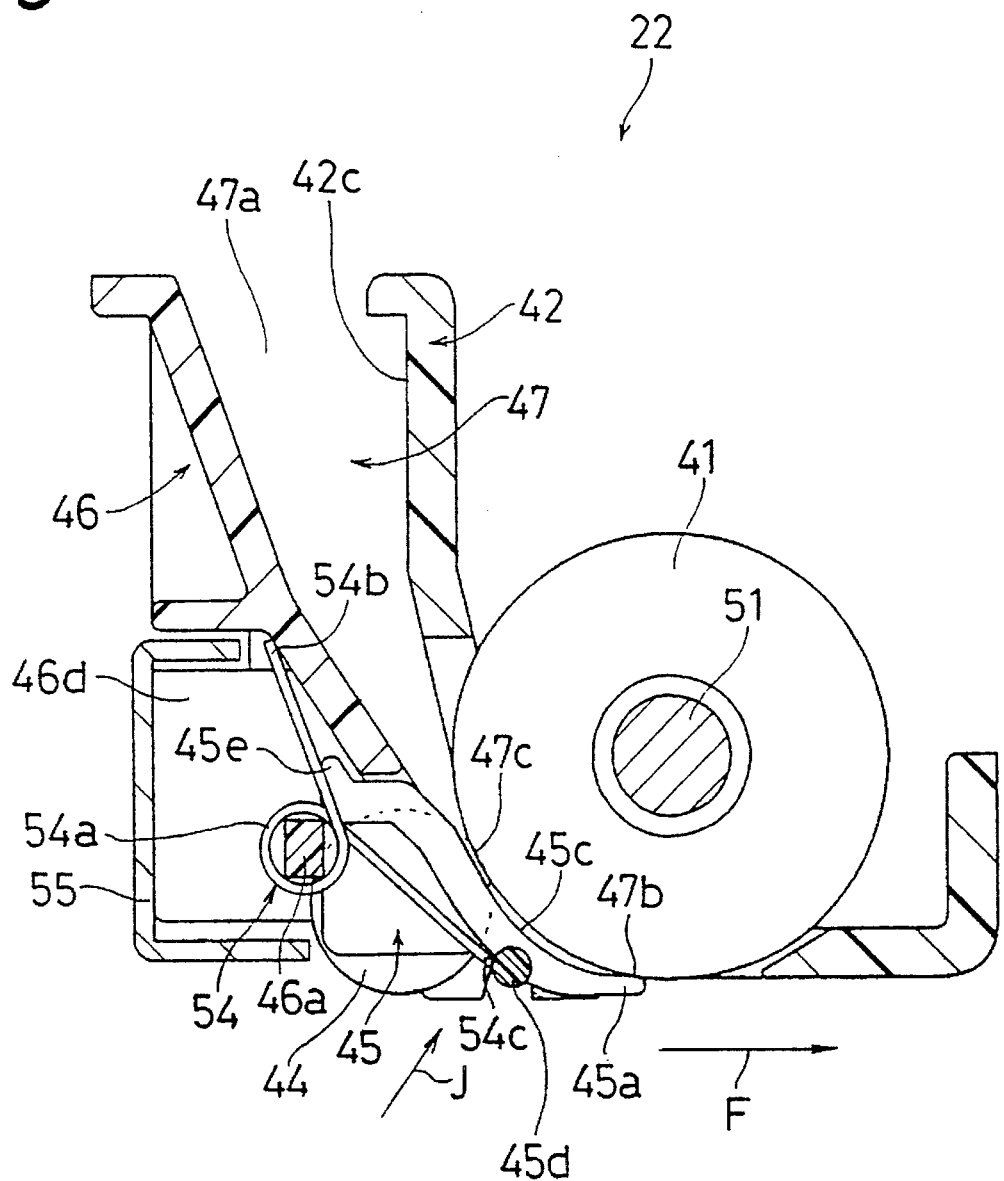
FIG. 19 is a schematic cross-sectional view of a paper feeding device 22 which shows the state of the retaining guide 45 and a spring member 54 mounted on the sub frame 46.
Figure 20:
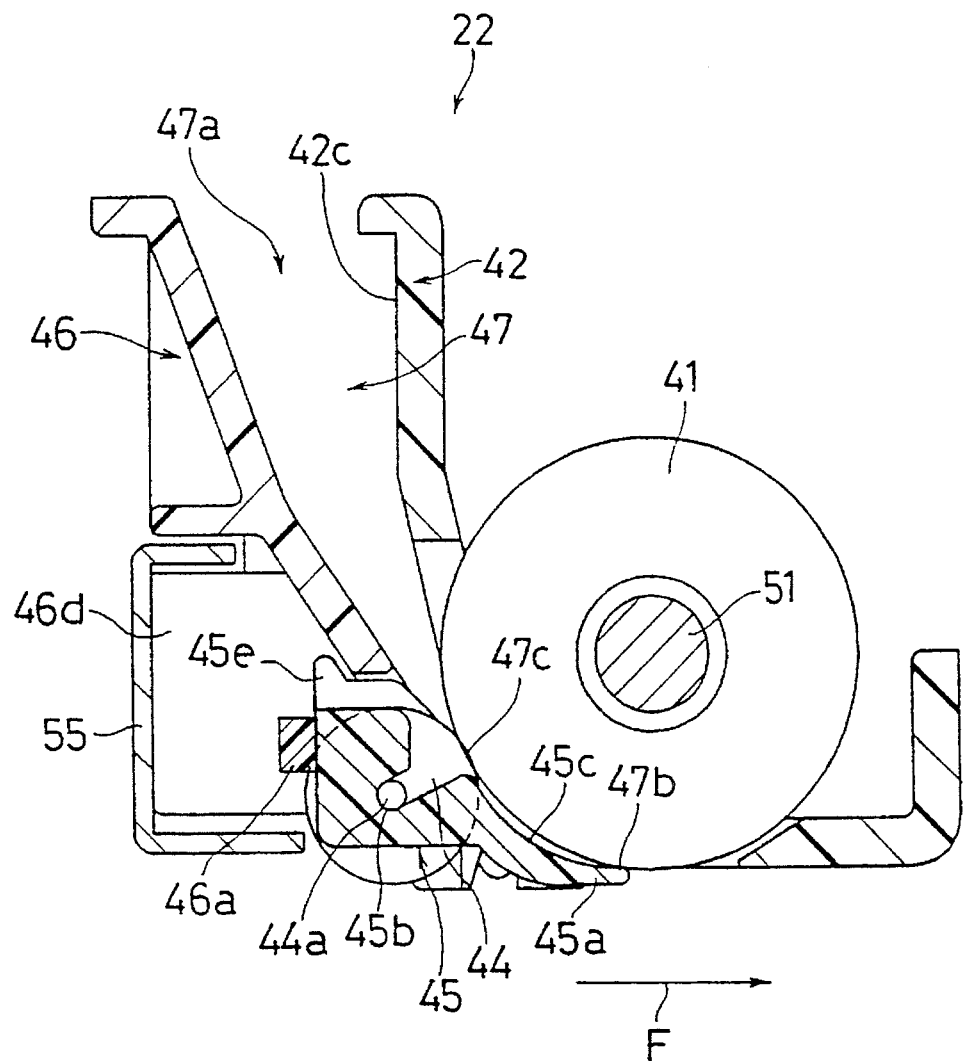
FIG. 20 is a schematic cross-sectional view of the feeding device 22 which shows the state of a pinch roller 44 held by the retaining guide 45.

FIG. 19 is a schematic cross-sectional view of the paper feeding device 22 which shows the state of the retaining guide 45 and the spring member 54 mounted on the sub frame 46. The spring member 54 is held in such a manner that the respective coiled portions 54a of the spring member 54 are fitted over the supporting protrusions 46a on both sides of the cut section 46b. In this held state, the two end sides 54b of the spring member 54 press the wall of the sub frame 46 which is upstream in the direction of the arrow F, diagonally above as indicated by the arrow J, and consequently a part 54c of the block "c"-shaped bent portion of the spring member 54 which is located in a direction perpendicular to the direction of the arrow F presses the back side of the guide surface 45c of the retaining guide 45 in the direction of the arrow J. With the spring member 54 pressing the retaining guide 45 in the direction of the arrow J, the protrusions 45d of the retaining guide 45 are held in the recess grooves 46c of the sub frame 46. @101 FIG. 20 is a schematic cross-sectional view of the feeding device 22 which shows the state of the pinch roller 44 held by the remaining guide 45. The pinch roller 44 is held by fitting the protrusions 44a on both sides of the pinch roller 44 in the respective recess grooves 45b of the retaining guides 45. In this held state, the circumference of the pinch roller 44 and the front end 45a of the retaining guide 45 are in contact with the circumference of the feeding roller 41 through pressing by the spring member 45 shown in FIG. 19 in the direction of the arrow J.

Figure 21:
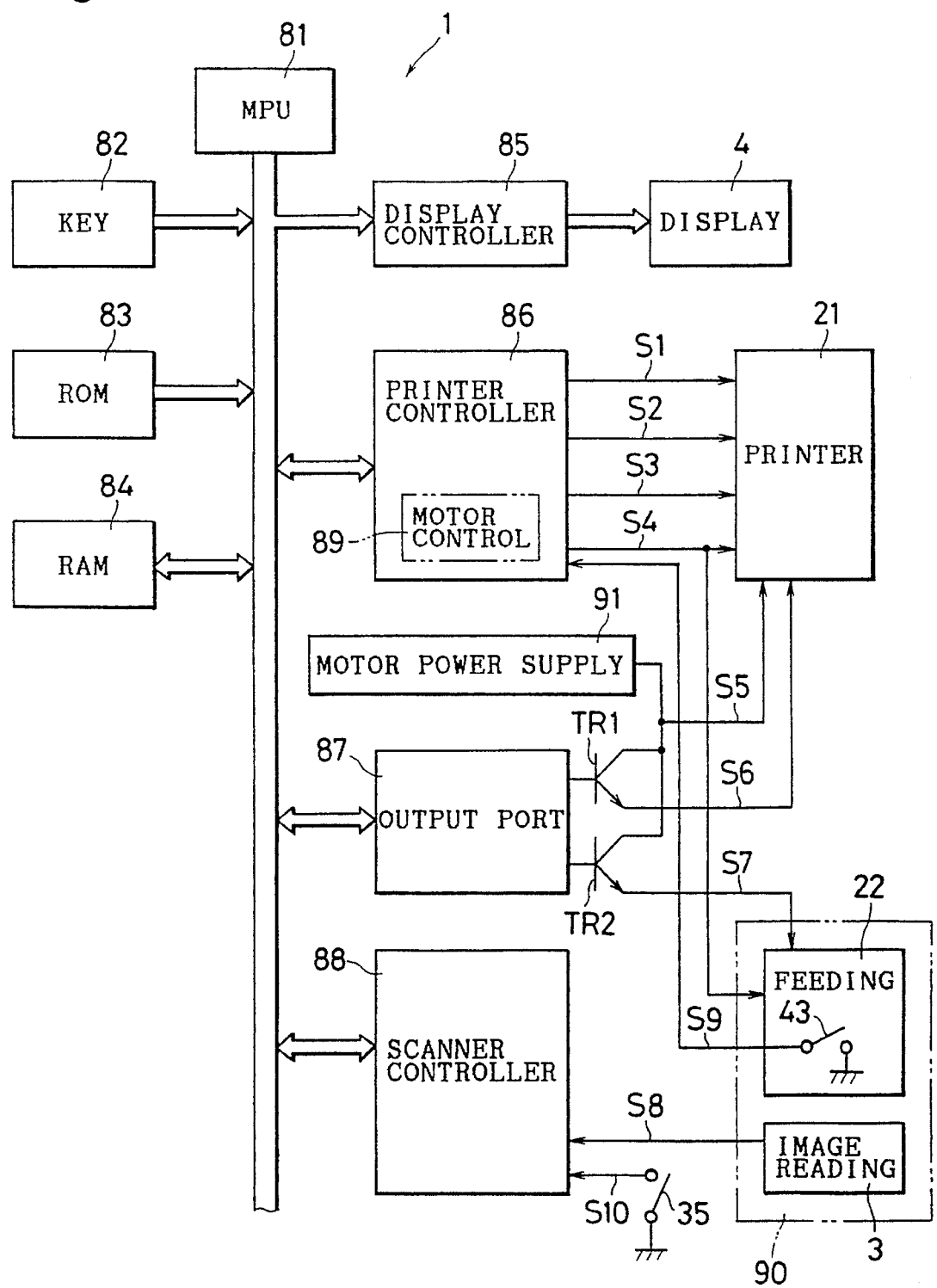
FIG. 21 is a schematic block diagram showing the electrical configuration of the information processing apparatus 1.

FIG. 21 is a schematic block diagram showing the electrical configuration of the information processing apparatus 1. The MFU 81 built in the information processing apparatus 1 has electrical connections with a key 82, a ROM (read only memory) 83, a RAM (random access memory) 84, a display controller 85, a printer controller 86, an output port 87 and a scanner con%roller 88. In addition, the display controller 85 is connected with a display section 4. The printer controller 86 has a connection with a printer 21 via signal conductors S1–S4 and a connection with a feeding device 22 via a signal line S9. The output port 87 are connected with base terminals of two transistors TR1 and TR2. The scanner controller 88 is connected with an image processing apparatus 3 via a signal line S8. The scanner controller 88 is also connected with a detection switch 35 via a signal line S10.

The aforementioned signal line S4 connects a motor control circuit 89 built in the printer controller 86, the printer 21 and the feeding device 22. The feeding device 22 and the image processing apparatus 3 constitute a reading section 90.

The respective collector terminals of the transistors TR1 and TR2 are connected with a motor power supply 91. The emitter terminal of the transistor TR1 is connected with the printer 21 via a signal line S6. The emitter terminal of the transistor TR2 is connected with the feeding device 22 via a signal line S7. In addition, the motor power supply 91 is connected with the printer 21 via a power supply line S5.

MPU 81 exerts electrical control over the entire information processing apparatus 1. The key 82 includes input keys 9, etc. provided on top of the body 2, and the user may input characters and operate the information processing apparatus 1 with the key 82. This input with the key includes input to the display panel 5 with a pen 6. The ROM 83 stores an operating program for operating the MFU 81 and initial data in advance. The RAM 84 stores information on characters input with the key 82, information on the image read with the image reading device 3, etc.

The display controller 85 is placed under control of the MPU 81, and displays characters and images on the display panel 5 mounted in the display section 4. A liquid crystal display may be used as the display panel 5 mounted in the display section 4. In this embodiment, a liquid crystal display was used for the display section 5, but a CRT (cathode ray tube) may be used instead.

The printer controller 86 is placed under control of the MPU 81 and controls the printer 21 via the signal conductors S1–S4. Print signals, which transmit information on characters to be printed, is supplied to the print-head 26 of the printer via the signal line S1. Up/down signals for up/down operation of the print-head 26 are supplied to a print-head drive section through the signal line S2. Lateral movement signals for lateral movement operation of the print-head 26 are supplied to the print-head drive section via the signal line S3. Drive signals for driving the feeding roller 23 is supplied to the motor via the signal line S4.

On the other hand, the printer controller 86 detects insertion of a document into the guide passage 47 via the signal line S9 connecting to the document detection switch 43 of the feeding device 22, and guides the document detection signal to the MPU 81. This document detection operation with the printer controller 86 and the document detection switch 43 will be described with reference to FIG. 23.

Drive signals for driving the motor 49 to rotate the feeding rollers 41 of the feeding device 22 are also supplied via the signal line S4. The printer controller 86 controls and drives the motor 49 on the basis of the document detection signals transmitted via the signal line S9.

The printer 21 has the construction shown in FIG. 14 explained above, and performs printing of characters and images based on print signals, up/down signals, lateral movement signals and driving signals which are fed via the signal conductors S1–S4.

The output port 87 and the transistors TR1, TR2 perform switching of the power supplied from the motor power source 91 via the power supply lines S6 and S7, under the control of the MPU 81. The switching operation performed by the output port 87 and the transistors TR1, TR2 is explained later with reference to FIG. 22. Here, the power supply line S6 serves to drive the motor which rotates the paper roller 23 of the printer 21, and the power supply line S7 serves to drive the motor 49 which rotates the feeding roller 41 of the feeding device 22.

Also, the power supply line S5 serves to drive the driving section for up/down movement and lateral movement of the print-head 26 of the printer 21.

The scanner controller 88 outputs image information supplied from the image reading device 3 to the MPU 81 via the signal line S8. The scanner controller 88 also detects whether the image reading device 3 is mounted in the body 2 through the signal line S10 connected to the detection switch 35, and outputs the result of the detection to the MPU 81.

Figure 22:
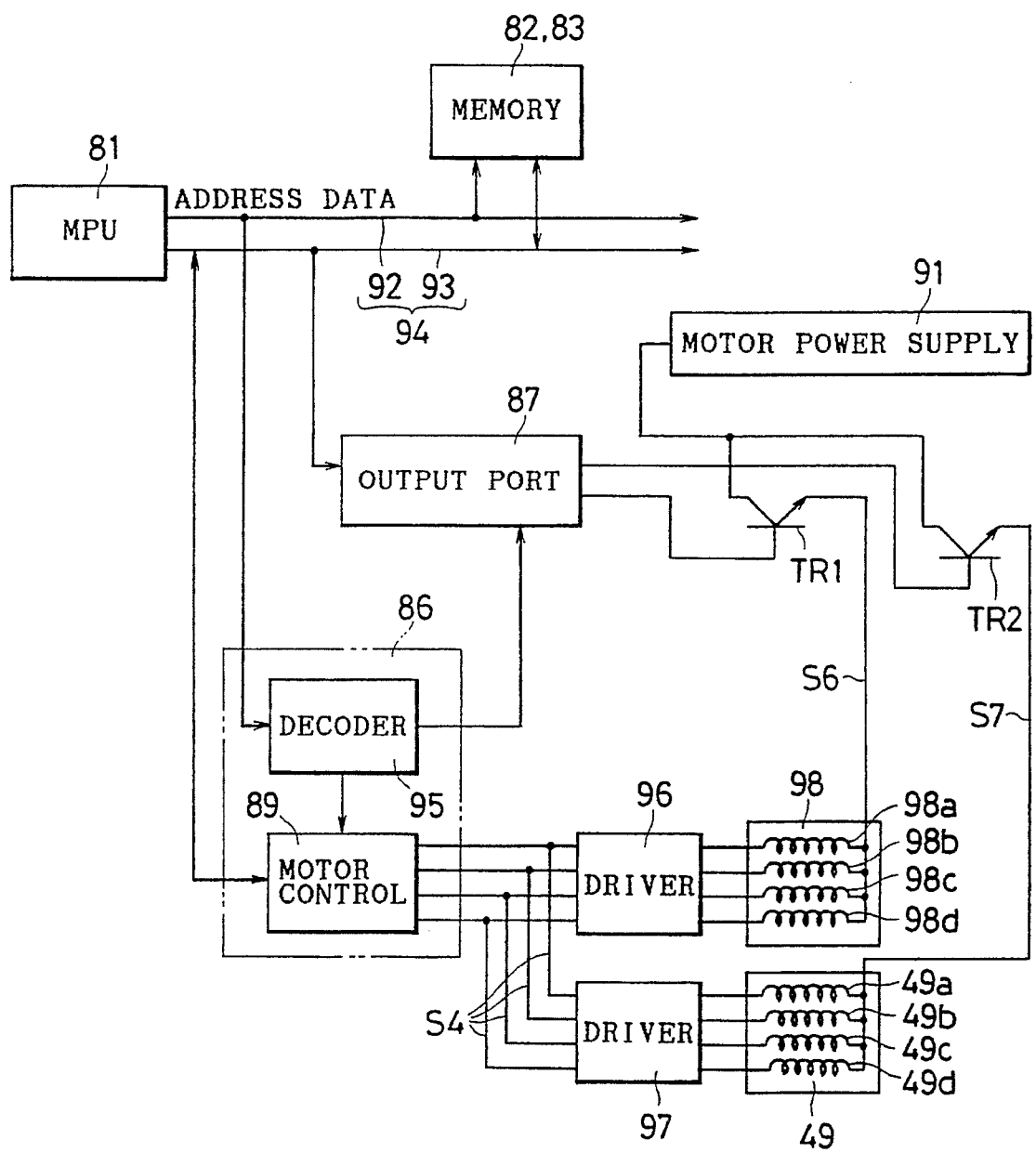
FIG. 22 is a fragmentary block diagram showing the electrical configuration of the information processing apparatus 1.

FIG. 22 is a fragmentary block diagram of the electrical construction of the information processing apparatus 1, and it shows the control system for the respective motors 98 and 49 which drive the respective feeding rollers 23 and 41 of the printer 21 and the feeding device 22. The parts in FIG. 22 corresponding to those in FIG. 21 are indicated by the same reference characters and therefore their description will be omitted. A bus line 94 comprising an address line 92 and a data line 93 is connected to the MPU 81. The output port 87 is connected to the data line 93. A decoder 95 included in the printer controller 86 is connected to the address line 92, and the motor control circuit 89 is connected to the data line 93.

The signal line S4 connected to the motor control circuit 89 is also connected to two drivers 96, 97. The driver 96 is connected to the motor 98 which drives the paper feeding roller 23 of the printer 21, while the driver 97 is connected to the motor 49 which drives the feeding roller 41 of the feeding device 22.

The MPU 81 outputs a prescribed address signal and data signal based on the information prerecorded in the memory, such as a ROM 82 or RAM 83.

The decoder 95 outputs to the output port 87 and the motor control circuit 89 an indication signal indicating the address at which the data signal from the MFU 81 is to be inputted, based on the prescribed address signal outputted from the MFU 81. When the indication signal is inputted to the output port 87, the data signal is inputted from the MPU 81 to the address indicated by the indication signal. The output port 87 switches the signal levels of the signals outputted to each transistor TR1, TR2 between high level and low level, based on the indication signal and data signal inputted in this manner.

The motor control circuit 89 reads in the data signal outputted from the MPU 81 at the address indicated by the indication signal from the decoder 95, and outputs a control signal controlling the motor 98 or 49 to the driver 96 or 97 via the signal line S4. The drivers 96 and 97 excite the respective coils 98a–98d and 49a–49d of the motors 98, 49, which will be described later, by the current supplied from the motor power supply 91 via the transistors TR1 and TR2, based on control signals from the motor control circuit 86.

The motors 98 and 49 are 4-phase stepping motors equipped with coils 98a–98d and 49a–49d forming 4 groups. One end of each of the respective coils 98a–98d and 49a–49d of the respective motors 98 and 49 are connected to the respective common power source lines S6 and S7, and the other ends thereof are separately connected to drivers 96 and 97.

When the motor 98 is driven, the output port 87 sets the signal to the transistor TR1 to high level, and the signal to the transistor TR2 to low level, based on the address signal and data signal from the MPU 81. This establishes connection with the transistor TR1 and disconnection with the transistor TR2. Establishing conduction with the transistor TR1 connects the motor power supply 91 and each of the coils 98a–98d of the motor 98.

When the address signal and data signal from the MPU 81 for driving the motor 98 are inputted to the printer controller 86 while the motor power source 91 and the coils 98a–98d are in a conduction state, the control signal from the motor control circuit 89 for driving the motor 98 is outputted to the driver 96 via the signal line S4. Based on this control signal, the coils 98a–98d of the motor 98 are excited by the driver 96, and the motor 98 is driven to rotate.

At this time, the control signal for driving the motor 98 is outputted to the driver 97 via the signal line S4, but since the transistor TR2 is cut off, the motor power supply 91 and the motor 49 are cut off, and the motor 49 is not driven by the driver 97.

Likewise, when the motor 49 is driven, the output port 87 sets the signal to the transistor TR1 to low level, and the signal to the transistor TR2 to high level, based on the address signal and data signal from the MPU 81. This severs disconnection with the transistor TR1 and results in disconnection between the motor power source 91 and the motor 98, and establishes conduction with the transistor TR2 to connect the motor power source 91 and the motor 49.

Figure 23:
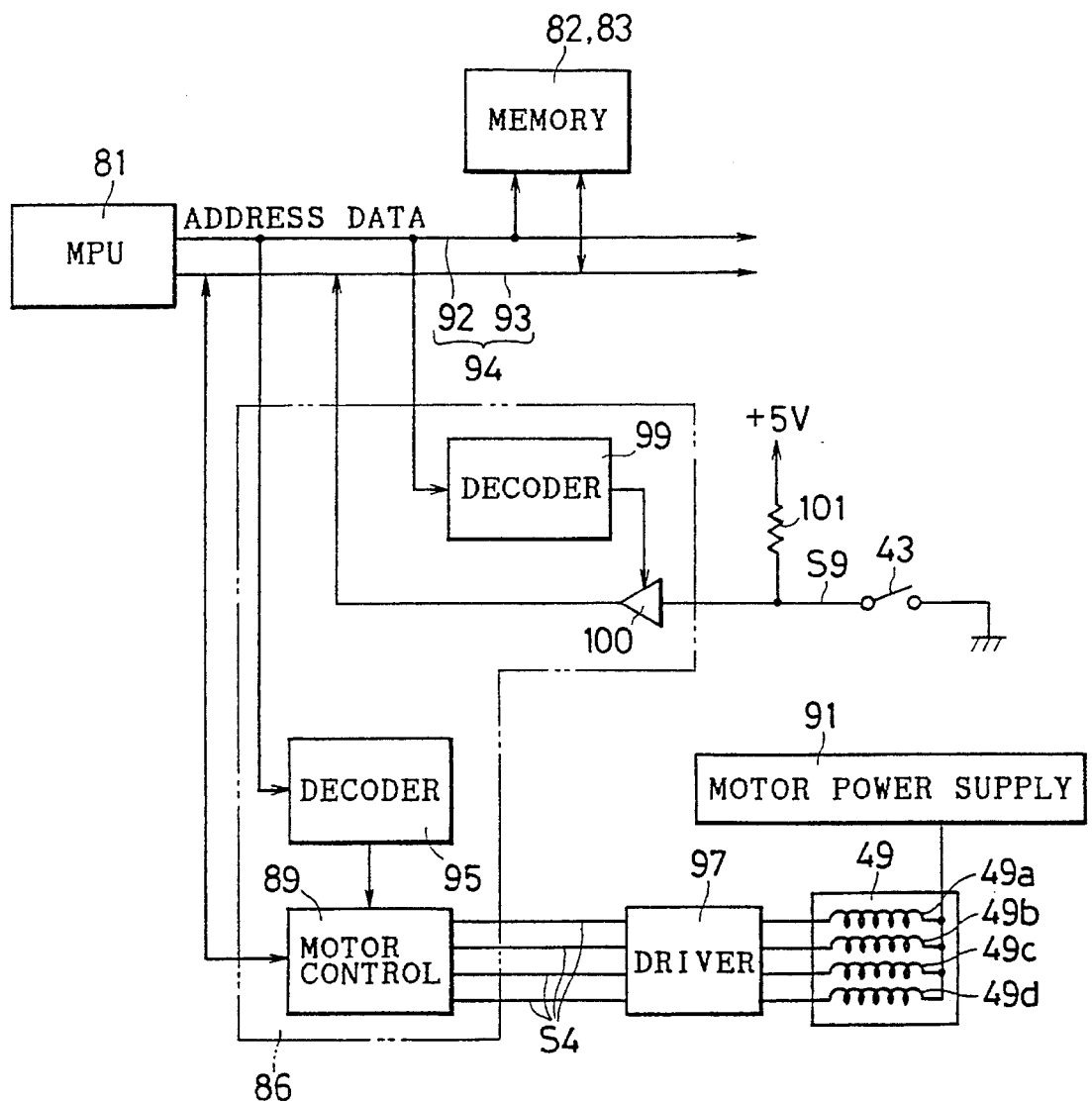
FIG. 23 is a fragmentary block diagram showing the electrical configuration of the information processing apparatus 1.

FIG. 23 is a fragmentary block diagram of the electrical construction of the information processing apparatus 1, and it shows the control system for the motor 49 which drives the feeding roller 41 of the feeding device 22. The parts in FIG. 23 corresponding to those in FIGS. 21 and 22 are indicated by the same reference characters and therefore their description will be omitted. As shown in FIG. 23, the printer controller 86 comprises a decoder 99 and an input port 100 in addition to the decoder 95 and motor control circuit 89.

The decoder 99 is connected to the address line 92 and the input port 100. The input port 100 is connected to a date line 93 and a signal line S9 running from the document detection switch 43 built in the feeding device 22. The signal line S9 is connected to a power supply line through which a voltage of 5 volts is applied via a resistor 101, and a prescribed voltage is applied to the terminal at the printer controller 85 end of the document detection switch 43. The decoder 99 outputs to the input port 100 an indication signal indicating the address to which the input signal from the reading section 90 is to be inputted, based on the prescribed address signal outputted from the MPU 81. The input port 100 reads in the data signal from the reading section 90, for example, a document detection signal inputted via the signal line S9, at the address indicated by the indication signal from the decoder 95, and outputs it to the MPU 81 as the prescribed data signal.

The document detection switch 43 is "off" when the detector piece 43a of the document detection switch 43 shown in the previously explained FIG. 15 is in the state indicated by the solid line, and "on" when it is in the state indicated by the alternative long and two short dashes line. When the document detection switch 43 is "off", the document detection signal is at high level. Switching "on" of the document detection switch 43 by insertion of a document into the guide passage 47 grounds the power supply line connected to the signal line S9 via the resistor 101, and this switches the document detection signal from high level to low level. When the document has completed passage over the detector piece 43a of the document detection switch 43, the document detection switch 43 is switched "on", and the document detection signal is again switched to high level.

The MPU 81 controls the motor 49 via the decoder 95 and the motor control circuit 89, etc. based on the document detection signal inputted via the input port 100. Control of the motor 49 by the MPU 81 will now be described with reference to FIG. 24.

Figure 24:
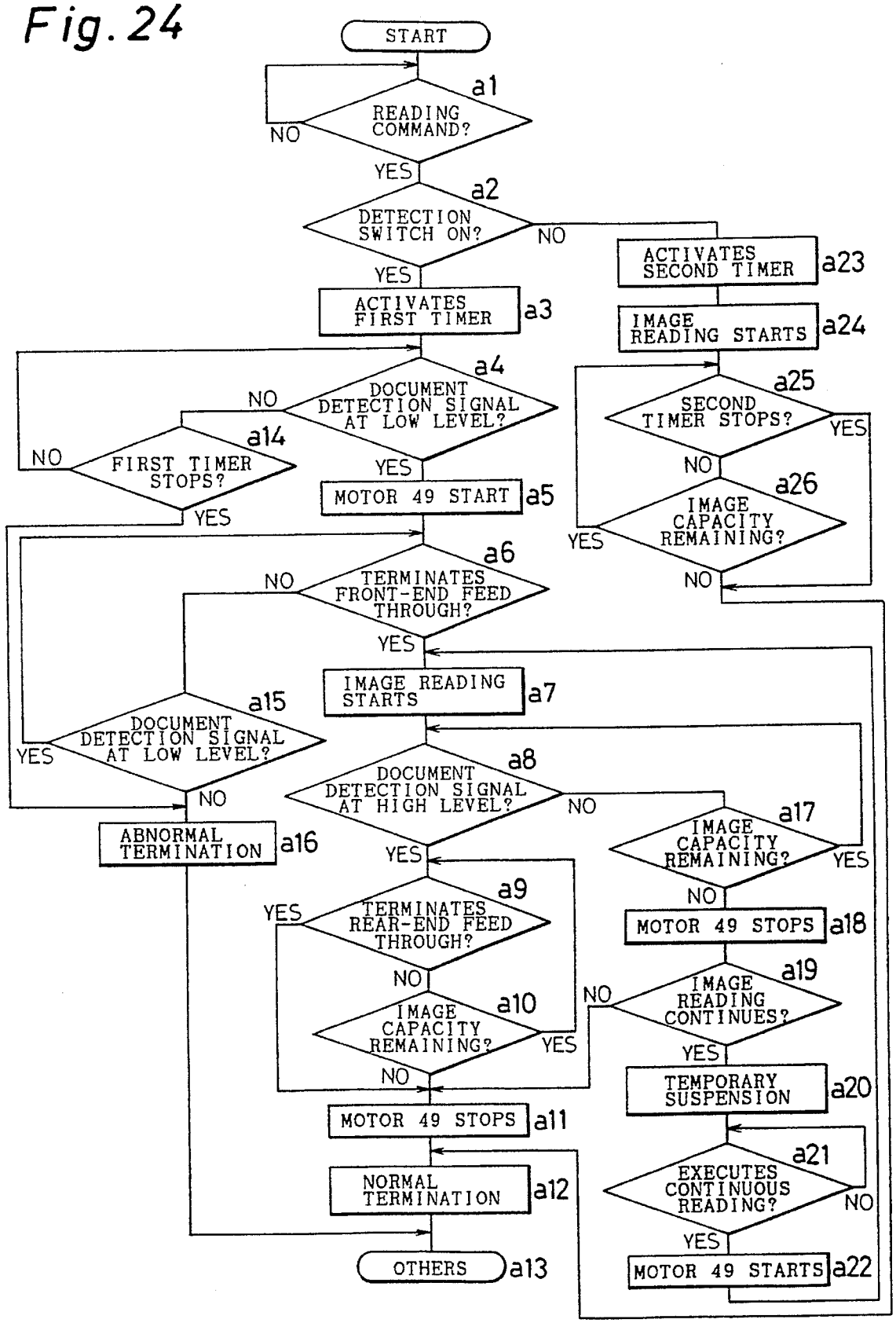
FIG. 24 is a flow chart which illustrates the control operation of an MPU 81 mounted in the information processing apparatus 1.

FIG. 24 is a flow chart illustrating a control operation of the MPU 81 provided in the information processing apparatus 1, and it shows an image reading operation. In step a1, it is determined whether an image reading command has been given by a user key 82, and in cases where a reading command has been given, the operation moves to step a2, while in cases where a reading command has not been given step a1 is repeated until a reading command is given. In step a2, it is determined whether the detection switch 35 is "on", i.e. whether the image reading device 3 has been mounted in the body 2, and in cases where the image reading device 3 has been mounted in the body 2 the operation moves to step a3, while in cases where the image reading device 3 has been detached from the body 2 the operation moves to step a23.

Here, the reading command by the user in step a1 above may include an internal use/external use command indicating whether internal use with the image reading device 3 mounted in the body 2 or external use with the image reading device 3 detached from the body 2. In cases where an internal use/external use command is included, for example, when a reading command is given in step a1 for internal use and the operation moves to step a2 while the detection switch 35 is "off" and the image reading device 3 is detached from the body 2, there may be displayed an error message on the display section 4 to indicate that the image reading device 3 should be mounted in the body during which time the reading operation is temporarily suspended.

In step a3, there is activated a first timer for standby for a prescribed time until a document is inserted in the guide passage 47, and then the operation moves to step a4 where it is determined whether the document detection signal is low level, i.e. whether a document has been inserted in the guide passage 47; in cases where a document has been inserted and the document detection signal is at low level, the operation moves to step a5, while in cases where no document has been inserted and the document detection signal is at high level, the operation moves to step a14. The first timer activated in step a3 stops when a prescribed period, for example 10 seconds, has been clocked.

In step a14, it is determined whether the first timer has clocked the prescribed period and stopped, and in cases where the first timer has stopped, the operation moves to step a16, while in cases where it has not stopped, the operation moves to step a4 where the first timer clocks the prescribed period, or steps a4 and a14 are repeated until a document is inserted. Step a16 is an abnormal termination process to be described later.

In step a5, driving of the motor 49 for rotation of the feeding roller 41 is initiated, and as shown in FIG. 15, the document is fed from the contact position 47c between the feeding roller 41 and the pinch roller 44 toward the reading position 50 and the operation moves to step a6, where it is determined whether the front end of the fed document in the direction of the arrow F which is the direction of feeding has reached a point directly over the reading position 50, i.e. whether front-end feedthrough has been completed, and in cases where it has reached that position the operation moves to step a7 where image reading is initiated, and in cases where it has not reached that position, the operation moves to step a15.

The determination in step a6 of whether the document has reached the reading position 50 is a determination of whether the outer circumferential surface of the feeding roller 41 has rotated by the rotational distance from the contact position 47 to the reading position 50, and the rotational distance of the feeding roller 41 is determined by how many step rotations the motor 49 has completed. The number of steps rotated by the motor 49 for front-end feedthrough is set by running a program in the MFU 81 in advance. Here, in this case the distance of front-end feedthrough of the document is governed by the number of steps rotated by the motor 49, but in cases where the rotational speed of the motor 49 per unit time is fixed, it may be governed by the time after rotation of the motor 49 is initiated.

Also, in this case the distance of front-end feed-through of the document is defined as the feeding distance of the document from the contact position 47c to the reading position 50, but the distance of front-end feedthrough of the document may also be defined as the feeding distance from the contact position 47 via which the document is fed and the front end of the document in the direction of the arrow F passes over the reading position 50, until the end in the direction of the arrow F of the image to be read which is on the document reaches a point directly over the reading position 50.

In step a15, it is determined whether the document detection signal is at low level, and in cases where the document has been pulled out from the guide passage 47 by the user and the document detection signal is at high level, the operation moves to step a16, whereas in cases where the document is still inserted in the guide passage 47 and the document detection signal is at low level, the operation moves to step a6, and steps a6 and a15 are repeated until front-end feedthrough of the document has been completed. The reading of the document detection signal in this step a15 is necessary to detect whether the user has pulled out the document from the guide passage 47 to avoid a document jam, in the event that a document inserted in the guide passage 47 has been poorly inserted.

In step a16, an abnormal termination process is performed, during which the user is prompted to insert a document in the guide passage 47, and the operation moves to step a13 where other processing is performed.

When reading of an image is initiated in step a7, the operation moves to step a8, where it is determined whether the document detection signal is at high level, i.e. whether the tail end of the document which is upstream with respect to the direction of feeding of the document has passed the front section 43b of the detector piece 43a of the document detection switch 43, and in cases where the document detection signal is at low level and the tail end of the document has not passed the front section 43b of the detection piece 43a, the operation moves to step a17, whereas in cases where the tail end of the document has passed the front section 43b of the detector piece 43a, the operation moves to step a9.

In step a17 it is determined whether there is remaining image capacity as preset by the user to correspond to a reading area to be read by one reading operation, and in cases where there is capacity remaining the operation proceeds to step a8 where the image is read while steps a8 and a17 are repeated until the document detection signal is switched from low level to high level.

In step a8 above, when it is determined that the tail end of the document has passed over the front section 43b of the detector piece 43a, the operation moves to step a9 where it is determined whether the tail end of the document has passed the terminal 47b of the guide passage 47, i.e. whether tail-end feedthrough of the document has been completed, and in cases where it is determined that tail-end feedthrough of the document has been completed, the operation moves to step a11, whereas in cases where it is determined that tail-end feedthrough of the document has not be completed, the operation moves to step a10.

It is determined whether tail-end feedthrough of the document has been completed in step a9 above by determining whether the feeding roller 41 has rotated by the feeding distance of feeding the document from the front section 43b of the detector piece 43a to the terminal 47b of the guide passage 47 after the document detection signal has been switched from low level to high level, similar to the determination in step a6 above in relation to the front-end feedthrough of the document.

In step a10, similar to step a17 above, it is determined whether there is image capacity remaining, and in cases where it is determined that there is, the operation moves to step a9, where image reading is continued while repeating steps a9 and a10 until either tail-end feedthrough of the document has been completed or there is no image capacity remaining. In cases where it is determined in step a10 that there is no image capacity remaining, i.e. in cases where the image capacity has been used up partway through the document image to be read, the operation moves to step a11.

In step a11, driving of the motor 49 is stopped and reading of the image is simultaneously completed, and the operation moves to step a12 where a normal termination process is performed during which a message indicating completion of the image reading is displayed on the display 4, after which the operation moves to step a13 where other operations may be performed. In order to avoid jamming of the tail end of the document in the guide passage 47, the stopping of the motor 49 in step a11 is performed only after the motor 49 has continued to rotate up to the time when the document detection signal has switched from low level to high level and tail end feedthrough of the document has been completed.

In cases where it is determined in step a17 above that there is no image capacity remaining, the operation moves to step a18 where driving of the motor is terminated, and then to step a19 where the user is prompted to determine whether to continue the image reading. In cases where the user has chosen to continue image reading by pressing the key 82, the operation moves to step a20, whereas in cases where the user has chosen not to continue image reading, the operation moves to step a11, and after the motor 49 has been driven up to the time when the document is ejected from the guide passage 47, the motor 49 is stopped, and the operation moves to step a12 where the previously mentioned normal termination processing is performed.

In step a20, processing is temporarily suspended to backup the image information read in up to the previous step a18, from the RAM 84 onto other recording means such as a floppy disk or hard disk, and the operation proceeds to step a21.

In step a21, it is determined whether a command for continuation of reading has been given with the user key 82, and in cases where it has been given, the operation moves to step a22, driving of the motor 49 is initiated, the operation moves to step a7, and image reading is initiated. Also, the operation is paused at step a21, and step a21 is repeated until the command for continuation of reading is given by the user.

On the other hand, in cases where the detection switch 35 has been cut off in step a2 explained above and it is determined that the image reading device 3 has been detached from the body 2, the operation proceeds to step a23, in which there is activated a second timer for setting the maximum time required for one reading operation by the image reading device 3, and the operation proceeds to step a24. The second timer activated in step a23 stops after a prescribed preset time, for example, 30 seconds, has been clocked.

In step a24, image reading by the image reading device 3 is initiated. The image reading is initiated when the user presses a starting button which is provided on, for example, the upper side of the image reading device 3, i.e. the side opposite the side on which the reading glass 20 is provided. Reading of the image by the image reading device 3 detached from the body 2 is performed, as shown in FIG. 6, by sliding the image reading device 3 over the surface of the document 15 which bears an image to be read, while pressing down the starting button.

In step a25, it is determined whether the second timer has clocked the prescribed period of time and stopped, and in cases where it has not stopped, image reading continues and the operation proceeds to step a26, whereas in cases where it has stopped the operation proceeds to step a12, and image reading is completed.

In step a26, it is determined whether there is image capacity remaining, as in steps a10 and a17 explained above, and in cases where there is none remaining the operation proceeds to step a12 and the image reading is terminated, whereas in cases where there is capacity remaining the operation proceeds to step a25 where the second timer is stopped, or else steps a25 and a26 are repeated for image reading until the remaining image capacity is used up.

Here, a light emitting element, such as a light emitting diode, is provided on the upper surface of the image reading device 3, and the light emitting element may be switched on during the interval between step a23 and step a12, i.e. the interval which allows the user to slide the image reading device 3 while pressing down the starting button to perform image reading, in order to notify the user that reading is possible.

In this manner, the image reading device 3 may be mounted in the body 2 to make the body 2 and the image reading device 3 into one unit for storage of the information processing apparatus 1 or carrying of the information processing apparatus 1. Consequently, when the information processing apparatus 1 is stored, there is no need to remove the cable 31 running between the body 2 and the image reading device 3 from the body 2 as according to the prior art, and this reduces the labor required for storing and retrieving of the information processing apparatus 1, allowing an improvement in the operability of the information processing apparatus 1. Furthermore, since the information processing apparatus 1 may be carried with the image reading device 3 mounted in the body 2, the information processing apparatus 1 also has improved portability.

With the construction where the image reading device is directly mounted into the body, in cases where the image reading device is to be securely mounted into the body and the image reading device is to be precisely positioned in the body, the image reading device must have a shape suitable for mounting, and thus there is less freedom in selecting the shape of the image reading device which may impair the design of the image reading device. Conversely, in cases where the design of the image reading device is given priority whereby the shape of the image reading device is determined, there is required a more complicated fixing mechanism for mounting the image reading device into the body, and it may become impossible to precisely position it in the body. Nevertheless, since the image reading device 3 is housed in the receiving box 8 and mounted into the body 2, there is no impairment on the design of the image reading device 3, and it may be in a shape which allows precise positioning in the body 2 when housed in the body 2.

Also, when the image reading device 3 has been detached from the body 2, the opening of the recess 17 is blocked by the end wall 8h of the receiving box 8 when the receiving box 8 is mounted in the recess 17 of the body 2, and this helps to prevent invasion by dust and the like into the recess 17, and allows freedom of design of the body 2.

A feeding device 22 is also mounted in the body 2. Sheet documents inserted through the document insertion port 12 of the body 2 are fed by the feeding device 22 over the reading glass 20 of the image reading device 3 mounted in the body 2, and the image of the document is read by the image reading device 3. Consequently, since image reading may be performed with the image reading device 3 mounted in the body 2, operability of the information processing apparatus 1 is improved in cases of frequent storing and retrieving of the information processing apparatus 1 as required according to the prior art, without the need for the image reading device 3 to be detached from the body 2 each time an image is read.

Also, since the image reading device 3 may be detached from the body 2 and used as a hand-held scanner in order to read an image when the image to be read is in newspapers, books or the like, there is no need for a separate hand-held scanner for reading images from newspapers, books, etc., thus augmenting the functionality of the information processing apparatus 1.

Also, as shown in FIG. 4, since the document insertion port 12 is located in the upper surface of the body 2, a document may be inserted into the document insertion port 12 from above the body 2, thereby facilitating insertion of the document, and thus the operability of the information processing apparatus 1 may be improved.

In addition, since the document insertion port 12, paper insertion port 11a into which recording paper is inserted and paper outlet 11b through which the recording paper is ejected are all covered and uncovered by the single cover member 10, no separate cover member is required for the document insertion port 12 even in cases where the document insertion port 12 is provided in the body 2, and thus opening and closing operation for the cover member 10 may be made less often.

Figure 25:
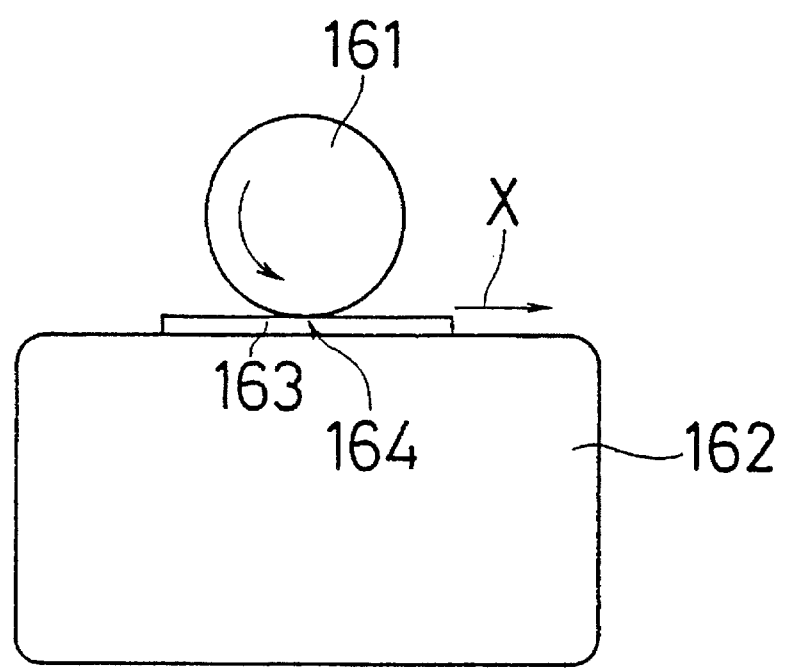
FIG. 25 is a view which shows the state of a feeding roller 161 in contact with a reading glass 163 of an image reading device 162.

In cases where, as shown in FIG. 25, the design is such that documents are fed with the feeding roller 161 in contact with the reading glass 163 of the image reading device 162, the documents are fed in the direction of the arrow X while being pressed down at the reading position 164 of the reading glass 163 by the feeding rollers 141, and therefore reading is possible for the image up to the end of the document toward the direction opposite to the direction of the arrow X, i.e. the tail end, allowing the lower margin to be smaller; however, this construction wherein the feeding rollers 161 are in contact with the reading glass 163 of the image reading device 162 tends to create variations in the pressure distribution at the point of contact between the feeding rollers 161 and the reading glass 163, and such variations in the pressure distribution tend to cause problems such as wrinkling of documents, failure to read the document images, and jamming of documents when the documents are fed between the feeding rollers 161 and the reading glass 163. In addition, with this construction wherein the feeding rollers 161 is in contact with the reading glass 163, when it is attempted to design the image reading device 162 so as to be attachable and detachable with respect to the body which is provided with the feeding rollers 161, variations in positioning when the image reading device 162 is mounted in the body tend to result easier in variations in the pressure distribution at the point of contact between the feeding roller 161 and the reading glass 163.

In contrast, when the image reading device 3 is mounted in the body 2 of the information processing apparatus 1, the reading glass 20 of the image reading device 3 is disengaged from the feeding roller 41, with a prescribed gap W being set between the reading glass 20 and the feeding roller 41, as shown in FIG. 15. Consequently, the document may be smoothly fed between the feeding roller 41 and the reading glass 20, and it is possible to satisfactorily read images from documents without wrinkling them. The information processing apparatus 1 is also provided with the retaining guide 45 which contacts the circumference of the feeding roller 41 downstream from the contact position 47c between the feeding roller 41 and the pinch roller 44 with respect to the direction of document feeding and upstream from the reading position 50 on the reading glass 20 with respect to the direction of feeding. Consequently, even when the tail end of the document which is upstream with respect to the direction of feeding passes through the contact position 47c, the document is fed by the feeding rollers 41 until the tail end of the document passes through the terminal 47b of the guide passage 47 at which the front end 45a of the retaining guide 45 is in contact with the outer circumferential surfaces of the feeding rollers 41, and therefore the lower margin of the document may be made smaller even when the reading glass 20 and the feeding rollers 41 are disengaged.

Furthermore, as shown in FIG. 24, when a document is inserted into the guide passage 47 of the information processing apparatus 1 and a reading command is given by the user at step a1, the motor 49 is driven to drive the feeding rollers 41 in step a5, and in step a6 it is determined whether the front-end feedthrough has been completed, that is, whether the downstream end of the document in the direction of feeding of document has reached the reading position 50 from the contact position 47c between the feeding roller 49 and the pinch roller 44, and in cases where it is determined that front-end feedthrough has been completed, reading of the document image is initiated by the image reading device 3 in step a7.

Even supposing that the image reading device 3 initiates reading of the image at the same time the driving of the motor 49 is initiated, the image reading device 3 reads the bottom of the feeding device 22, not the document, until the image reaches the reading position 50, and an unwanted portion is produced in the image read by the image reading device. When an unwanted portion is produced in the read image in this manner, the image reading operation is further complicated since the user must eliminate this unwanted portion. In contrast, since in this information reading apparatus 1, reading of the image is initiated by the image reading device 3 after the front end of the document which is downstream in the direction of feeding reaches the reading position 50, no unwanted portion is produced in the image read by the image reading device 3, and since no unwanted image information is recorded in the RAM 84, the region for recording image information in the RAM 84 may be more effectively utilized.

Furthermore, since as shown in FIG. 22, the motor 98 which drives the feeding roller 23 provided in the printer 21 and the motor 49 which drives the feeding rollers 41 provided in the feeding device 22 are controlled by the common motor control circuit 89 in the information processing apparatus 1, there is no need to include a separate motor control circuit for the motor 49, even though a feeding device 22 is provided in the body 2, and this helps to reduce the cost of the information processing apparatus 1. In addition, the fact that no separate motor control circuit is needed means that the information processing apparatus 1 may be made smaller and the control circuit of the information processing apparatus 1 may be made simpler.

Figure 26:
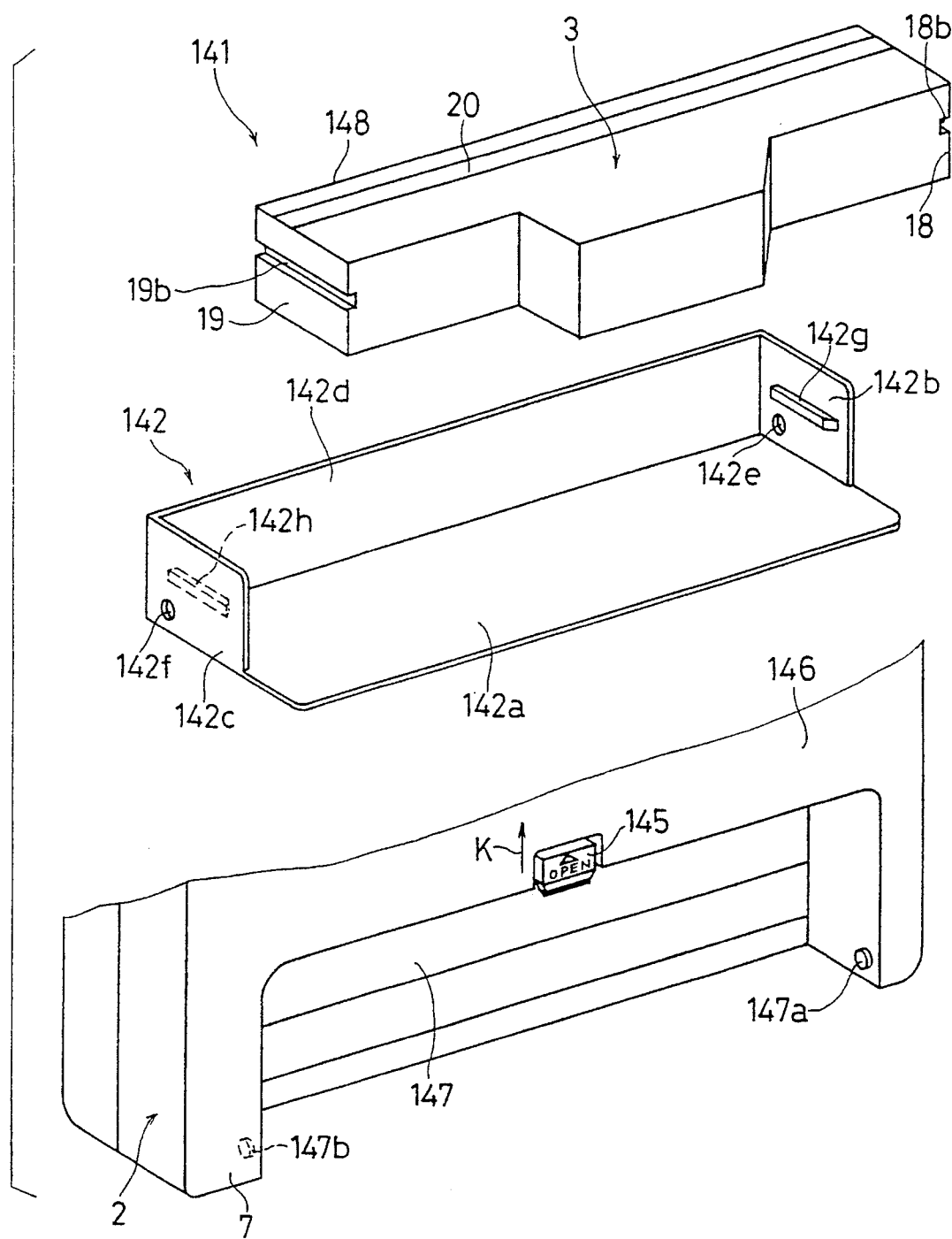
FIG. 26 is a perspective view which shows the configuration of the image reading device 3 and a receiving member 142 to be mounted in an image processing apparatus 141 which is another embodiment of the invention, and a section of the body 2 of the information processing apparatus 141 which receives the receiving member 142, when viewed from the bottom of the body 2, with the back side 7 of the body 2 down.

FIG. 26 is a perspective view which shows the configuration of the image reading device 3 and a receiving member 142 to be mounted in an image processing apparatus 141 which is another embodiment of the invention, and a section of the body 2 of the information processing apparatus 141 which receives the receiving member 142, when viewed from the bottom of the body 2, with the back side 7 of the body 2 down. In FIG. 26, parts identical or similar to the parts of the information processing apparatus 1 are indicated by the same reference characters.

Guide grooves 18b and 19b are provided instead of the flanges 18a and 19a on both sides 18 and 19 of the image reading device 3. The receiving member 142 comprises a bottom plate 142a, two mutually opposing side walls 142b and 142c and one end wall 142d. In the two side walls 142b and 142c there are formed respective openings 142e and 142f and guide protrusions 142g and 142h jutting out from the side walls 142b and 142c toward the direction of their mutual proximity. The openings 142e and 142f are formed at the peripheral sections of the side walls 142b and 142c near the sections where the bottom plate 142a and the end wall 142d meet.

A recess 147 is formed in the body 2, to make opening at the back side 7 and the bottom side 146 of the body 2. Supporting protrusions 147a and 147b are formed in both of the mutually opposing side walls of the recess 147, jutting out in the direction of mutual proximity. The supporting protrusions 147a and 147b are formed at locations near the bottom side 146 and back side 7 of the recess 147. These supporting protrusions 147a and 147b are fitted in the respective openings 142e and 142f of the aforementioned receiving member 142, and the receiving member 142 is pivotably supported by the supporting protrusions 147a and 147b.

An engaging member 145 is provided on the bottom side 146 of the body 2, in a portion which faces the upper end of the recess 147, as shown in FIG. 26. The engaging member 145 is pivotably supported by the body 2 in the direction of the arrow K.

The image reading device 3 is received into the receiving member 142 by being inserted into the receiving member 142 from the side of the receiving member 142 which has no end wall. The guide grooves 18b and 19b of the image reading device 3 are guided by the guide protrusions 142g and 142h of the receiving member 142. When the image reading device 3 has been received in the receiving member 142, the end face 148 of the image reading device 3 in which no protrusions have been formed comes into contact with the end wall 142d of the receiving member 142.

Figure 27:
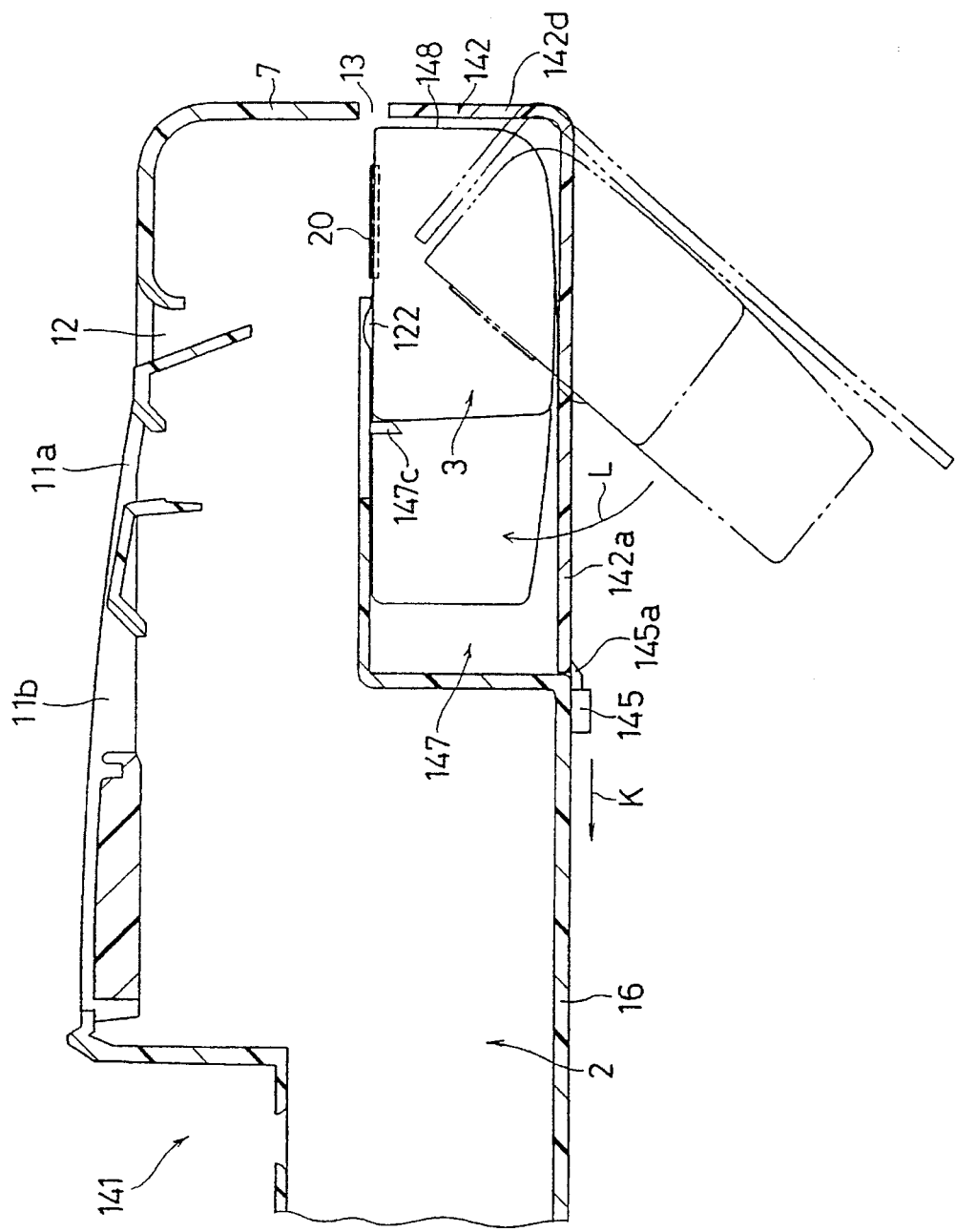
FIG. 27 is a schematic cross sectional view of the information processing apparatus 141 which shows the state of the image reading device 3 mounted in the body 2.

FIG. 27 is a cross sectional view of an information processing apparatus 141 which shows the information processing apparatus 141 in a state where the image reading device 3 is mounted in the body 2. The parts in FIG. 27 corresponding to those of the information processing apparatus 1 in FIG. 14 are indicated by the same reference characters. The printer 21 and the feeding device 22 are omitted in FIG. 27.

The image reading device 3 is mounted in the body 2 by receiving the image reading device 3 in the receiving member 142 and rotating the receiving member 142 in the direction of the arrow L to insert it into the recess 147, as indicated by the alternative long and two short dashes line in FIG. 27. The receiving member 142 inserted into the body 2 is engaged by the engaging member 145.

A positioning protrusion 147c is formed in and juts downward from the side wall above the recess 147, and the image reading device 3 is positioned in the direction of the arrow K and in the direction opposite to the direction of the arrow K, by being sandwiched between the end wall 142d of the receiving member 142 and the positioning protrusion 147c.

The image reading device 3 is pulled out from the body 2 by pushing the engaging member 145 in the direction of the arrow K, and releasing the engagement of the bottom plate 142a of the receiving member 142 with the front end 145a of the engaging member 145.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information processing apparatus comprising:
   an image reader, having a first housing, for reading image data;
   a body with a controller for processing the read image data together with document data; and
   a receiving device, having a second housing different from the first housing, detachably mounted to the body for removably housing the image reader.

2. The information processing apparatus according to claim 1, wherein when the image reader is housed in the receiver and the receiver is mounted to the body, a document to be scamped feeds along a path through the body so that the document moves across the image reader.

3. The information processing apparatus according to claim 2, wherein the body comprises:
   a printer for printing on recording paper; and
   a cover member for covering/uncovering a prescribed region of the body that includes a paper insertion port for inserting the recording paper to be printed by the printer, a paper outlet for ejecting the recording paper printed by the printer, and a document insertion port for inserting the document to be read by the image reader.

4. The information processing apparatus according to claim 2, wherein the document feeder comprises:
   a feeding roller situation at a position facing the surface of the image reading means that includes the reading position, and spaced a prescribed distance from the image reader;
   a pinch roller situation in the direction of feeding of the document, upstream from the reading position of the image reading means and in contact with the circumference of the feeding roller; and
   a guide member in contact with the circumference of the feeding roller situated in the direction of feeding, downstream from the contact position of the feeding roller and the pinch roller.

5. A computer having a data processor, an input device, and a display for performing data processing tasks including information input and information editing, comprising:
   a body housing the data processor, input device, and display;

a receiving unit, having a first housing, detachably mounted to the body; and an image reader, having a second housing different from the first housing, removably housed in the receiving unit and connected to the body by a flexible electrical conductor, wherein the image reader scans a document inserted into the body with the image reader housed in the receiving unit and the receiving unit mounted to the body, wherein the receiving unit may be detached and the image reader removed from the receiving unit by an operator to scan a separate document outside of the body, and wherein the data processor receives information from the image reader corresponding to a scanned document and displays the received information to permit an operator to manipulate the received information using the input device.

6. The computer in claim 5, wherein when the image reader is housed in the receiving unit and the receiving unit is mounted to the body, a document feeder in the body feeds the inserted document to be scanned through the body across the image reader.

7. The computer in claim 5, wherein the receiving unit is mounted to on the back side of the computer.

8. The computer in claim 5, wherein the inserted document is inserted in a first slot in the body for scanning by the scanner and ejected after scanning from a second slot in the body, the first and second slots being covered by a single protective cover.

9. The computer in claim 5, wherein the computer is a portable laptop computer and the body contains a hinged display panel that is rotated about a hinge into an upright position during operation of the portable laptop computer.

10. The computer in claim 5, wherein the receiving unit houses both the image scanner and the flexible electrical conductor.

11. The computer in claim 5, wherein the receiving unit is pivotally mounted and detached from the body about one end of the receiving unit.

12. The computer in claim 5, wherein the body includes a recess in which the receiving unit is detachably mounted.

13. The computer in claim 12, wherein the receiving unit has a T-shape and the recess is shaped to conform to the T-shaped receiving unit.

14. The computer in claim 13, wherein the image reader is T-shaped.

15. The computer in claim 14, wherein the image reader is other than T-shaped.

16. The computer in claim 5, wherein the image reader has a shape different than a shape of the receiving unit.

17. The computer in claim 5, further comprising:

a locking arrangement for securely mounting the receiving unit to the body including a release mechanism which when actuated by an operator unlocks the receiving unit for detachment from the body.

18. The computer in claim 5, wherein the body includes a detector that detects when the mounted receiving unit houses the image reader.

19. The computer in claim 5, wherein when the receiving unit is detached and the image scanner removed from the receiving unit, the image scanner is moved over the separate document to scan the separate document.

20. The computer in claim 5, wherein the image scanner includes:

rollers that permit the image scanner to be rolled over the separate document, and an encoder cooperating with one of the rollers to detect the movement of the image scanner across the separate document.

21. A method of operating an information processing device having a data processor, input device, and display for performing data processing tasks including document preparation and editing housed in a body where a receiving unit, having a first housing, detachably mounted to the body contains an image reader having a second housing different from the first housing, removably housed in the receiving unit and connected to the data processor by an electrical conductor, comprising the steps of:

in a first mode of operation, scanning a document using the image reader with the receiving unit mounted to the body;

in a second mode of operation, scanning a document using the image reader with the receiving unit detached from the body; and in both the first and second modes of operation, editing the scanned information.

22. The method in claim 21, wherein the information processing device is a portable personal computer.

23. The method in claim 21, wherein the image reader is removably housed in the receiving unit and in the second mode of operation, an operator removes the image reader from the detached receiving unit and scans a document by effecting relative movement between the image reader and the document.

24. The method in claim 21, wherein the first mode of operation, the document to be scanned is inserted into an opening of the body, guided through the body so that the inserted document is moved past the image reader.

25. A personal computer having a data processor, a memory, an input device, and a display for performing word processing tasks including creating and editing text documents, comprising:

a body housing the data processor, input device, and display, and an image reader connected to the body by a flexible electrical conductor, the image reader having a first housing which is housed in a receiving unit, having a housing different from the first housing, that is detachably mounted to the body, the receiving unit being detached from the body and the image reader removed from the receiving unit to scan a document, and wherein the image reader scans a document, the scanned information being transferred to the data processor over the electrical conductor and stored in the memory, and wherein an operator performs word processing operations on the scanned text information using the input device and the display.

26. The personal computer in claim 25, wherein the image reader scans a document inserted in an opening in the body and guided through the body over the image scanner.

27. The personal computer in claim 25, wherein the image reader is removably attached to the body and is detached from the body to scan a document.

* * * * *